United States Patent
Fushimoto et al.

(10) Patent No.: US 11,556,073 B2
(45) Date of Patent: Jan. 17, 2023

(54) ELECTROCONDUCTIVE ELASTIC BODY, ELECTROPHOTOGRAPHIC MEMBER, PROCESS CARTRIDGE, AND ELECTROPHOTOGRAPHIC IMAGE-FORMING APPARATUS

(71) Applicant: CANON KABUSHIKI KAISHA, Tokyo (JP)

(72) Inventors: Yasuhiro Fushimoto, Kanagawa (JP); Masafumi Kyogaku, Kanagawa (JP); Tetsuo Hino, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 79 days.

(21) Appl. No.: 17/328,189

(22) Filed: May 24, 2021

(65) Prior Publication Data
US 2021/0373448 A1 Dec. 2, 2021

(30) Foreign Application Priority Data

May 29, 2020 (JP) .............................. JP2020-094677
May 18, 2021 (JP) .............................. JP2021-083966

(51) Int. Cl.
*G03G 15/02* (2006.01)
*G03G 21/18* (2006.01)
(Continued)

(52) U.S. Cl.
CPC ............ *G03G 15/0233* (2013.01); *C08L 9/02* (2013.01); *G03G 15/0808* (2013.01);
(Continued)

(58) Field of Classification Search
CPC ........... G03G 15/0233; G03G 15/0808; G03G 15/0818; G03G 15/162; G03G 15/1685;
(Continued)

(56) References Cited

U.S. PATENT DOCUMENTS 9,146,482 B2  9/2015 Watanabe et al.
9,541,854 B2  1/2017 Kikuchi et al.
(Continued)

FOREIGN PATENT DOCUMENTS

JP  2002-296930 A  10/2002
JP  2004-133287 A  4/2004
(Continued)

OTHER PUBLICATIONS

Bando Technical Report No. 18/2014, pp. 4-7.
Kajihara, et al., "Molding Process, vol. 23, No. 2, pp. 72-77 (2011)".

*Primary Examiner* — Joseph S Wong
(74) *Attorney, Agent, or Firm* — Venable LLP

(57) ABSTRACT

An electroconductive elastic body includes: a cross-linked product of a first ionic electro-conductive rubber, a cross-linked product of a second ionic electro-conductive rubber, and at least one of a fatty acid and a fatty acid metal salt; wherein the electroconductive elastic body has a matrix that includes the cross-linked product of the first ionic electro-conductive rubber, and a domain that includes the cross-linked product of the second ionic electro-conductive rubber; the cross-linked product of the second ionic electro-conductive rubber includes a polyether skeleton; an electrical resistance of the domain is lower than an electrical resistance of the matrix; in a waveform separation profile of the elastic body as obtained by a small-angle X-ray scattering method, A2 and A1 satisfy a relationship expressed by the following expression (1):

$$0.005 \leq (A2 \times C2 / A1 \times C1) \leq 0.030 \qquad (1).$$

12 Claims, 7 Drawing Sheets

(51) Int. Cl.
  *C08L 9/02*   (2006.01)
  *G03G 15/08*  (2006.01)
  *G03G 15/16*  (2006.01)
  *G03G 15/20*  (2006.01)

(52) U.S. Cl.
  CPC ....... *G03G 15/0818* (2013.01); *G03G 15/162* (2013.01); *G03G 15/1685* (2013.01); *G03G 15/206* (2013.01); *G03G 15/2053* (2013.01); *G03G 21/1803* (2013.01); *C08L 2203/20* (2013.01)

(58) Field of Classification Search
  CPC ............. G03G 15/2053; G03G 15/206; G03G 21/1803; C08L 9/02; C08L 2203/20
  See application file for complete search history.

(56) References Cited

U.S. PATENT DOCUMENTS

| | | |
|---|---|---|
| 9,547,250 B2 | 1/2017 | Kikuchi et al. |
| 9,551,949 B2 | 1/2017 | Yamauchi et al. |
| 9,651,888 B2 | 5/2017 | Muranaka et al. |
| 9,665,029 B2 | 5/2017 | Hino et al. |
| 9,958,802 B2 | 5/2018 | Kikuchi et al. |
| 10,018,927 B2 | 7/2018 | Yamada et al. |
| 2004/0105983 A1 | 6/2004 | Hattori |
| 2007/0041752 A1* | 2/2007 | Mizumoto ......... G03G 15/0818 399/286 |
| 2012/0141162 A1* | 6/2012 | Mayuzumi ......... G03G 15/0233 428/323 |
| 2020/0071497 A1* | 3/2020 | Yao ..................... C08K 5/103 |
| 2020/0310265 A1 | 10/2020 | Nishioka et al. |
| 2021/0026295 A1 | 1/2021 | Yamada et al. |
| 2021/0048759 A1 | 2/2021 | Hino |

FOREIGN PATENT DOCUMENTS

| | | |
|---|---|---|
| JP | 2007-241307 A | 9/2007 |
| JP | 2016-42149 A | 3/2016 |

* cited by examiner

ELECTROCONDUCTIVE ELASTIC BODY, ELECTROPHOTOGRAPHIC MEMBER, PROCESS CARTRIDGE, AND ELECTROPHOTOGRAPHIC IMAGE-FORMING APPARATUS

BACKGROUND

The present disclosure relates to an electroconductive elastic body, an electrophotographic member, a process cartridge and an electrophotographic apparatus.

DESCRIPTION OF THE RELATED ART

In an electrophotographic image-forming apparatus, an electroconductive member is used in various applications, for example, as an electroconductive roller and blade such as a charging roller, a transfer roller, a developing roller and a developing blade. Japanese Patent Application Laid-Open No. 2002-296930 discloses a charging member that is disposed in an electrophotographic apparatus and charges a surface of a member to be charged in a state in which voltage is applied. The charging member includes an electroconductive elastic body layer, and the electroconductive elastic body layer is obtained by mixing and vulcanizing a ternary copolymer of polyethylene oxide-polypropylene oxide-allyl glycidyl ether and a polar rubber. It is disclosed that an electrical resistance value of the electroconductive elastic body layer is adjusted by the ternary copolymer of polyethylene oxide-polypropylene oxide-allyl glycidyl ether, which is a high-molecular compound, and that accordingly contamination due to migration of an electroconductive agent and a change in the electrical resistance value over time are suppressed.

SUMMARY

At least one aspect of the present disclosure is directed to providing an electroconductive elastic body that exhibits stable electroconductivity. At least another aspect of the present disclosure is directed to providing an electrophotographic member that contributes to the stable formation of a high-quality electrophotographic image. In addition, at least yet another aspect of the present disclosure is directed to the provision of a process cartridge that contributes to the stable formation of the high-quality electrophotographic image. In addition, at least still another aspect of the present disclosure is directed to providing an electrophotographic image-forming apparatus that can stably form a high quality electrophotograph. Furthermore, at least still another aspect of the present disclosure is directed to providing a method for manufacturing the electroconductive elastic body that exhibits the stable electroconductivity. Furthermore, at least still another aspect of the present disclosure is directed to providing a method for manufacturing an electrophotographic member that contributes to the stable formation of the high-quality electrophotographic image.

According to at least one aspect of the present disclosure, there is provided an electroconductive elastic body, including: a cross-linked product of a first ionic electro-conductive rubber, a cross-linked product of a second ionic electro-conductive rubber that is different from the first ionic electro-conductive rubber, and either one or both of a fatty acid and a fatty acid metal salt, the electroconductive elastic body having a matrix that includes the cross-linked product of the first ionic electro-conductive rubber, and a domain that includes the cross-linked product of the second ionic electro-conductive rubber, the cross-linked product of the second ionic electro-conductive rubber including a polyether skeleton, an electrical resistance of the domain being lower than an electrical resistance of the matrix, wherein in a waveform separation profile of the elastic body as obtained by waveform separation of a scattering profile measured at a temperature of 24° C. by a small-angle X-ray scattering method, a peak top of each of P1 and P2 exists in a range of 1.40 nm$^{-1}$ to 1.60 nm$^{-1}$, and a peak top of P3 exists in a range of 1.85 nm$^{-1}$ to 1.95 nm$^{-1}$, wherein P1 represents a peak attributable to the fatty acid, P2 represents a peak attributable to the fatty acid metal salt, and P3 represents a peak attributable to the cross-linked product of the second ionic electro-conductive rubber; and A2 and A1 satisfy a relationship expressed by the following expression (1):

$$0.005 \leq (A2 \times C2 / A1 \times C1) \leq 0.030 \quad (1)$$

wherein A1 represents a sum total of peak areas of P1 and P2, A2 represents a peak area of P3, C1 represents a content (% by mass) of the cross-linked product of the second ionic electro-conductive rubber in the elastic body, and C2 represents a content (% by mass) of the fatty acid and the fatty acid metal salt.

According to another aspect of the present disclosure, there is provided a method for producing the electroconductive elastic body described above, including:

(1) kneading a rubber mixture including the first ionic electro-conductive rubber, the second ionic electro-conductive rubber, and either one or both of a fatty acid and a fatty acid metal salt while applying extensional shear thereto, to thereby obtain an unvulcanized rubber mixture; and (2) curing the unvulcanized rubber mixture.

According to yet another aspect of the present disclosure, there is provided an electrophotographic member having an electroconductive elastic layer, the electrophotographic member including an electroconductive substrate and the electroconductive elastic layer on the substrate, wherein the elastic layer includes the electroconductive elastic body described above.

According to still another aspect of the present disclosure, there is provided a method for producing the above electroconductive member for electrophotography, including:

(1) kneading a rubber mixture including the first ionic electro-conductive rubber, the second ionic electro-conductive rubber, and either one or both of a fatty acid and a fatty acid metal salt while applying extensional shear thereto, to thereby obtain an unvulcanized rubber mixture;

(2) forming a layer of the unvulcanized rubber mixture that has been obtained in (1) on the substrate; and (3) curing the layer of the unvulcanized rubber mixture.

According to still another aspect of the present disclosure, there is provided a process cartridge configured to be detachable from a main body of an electrophotographic image-forming apparatus, the process cartridge including the above electrophotographic member. According to still another aspect of the present disclosure, there is provided an electrophotographic image-forming apparatus including the above electrophotographic member.

Further features of the present invention will become apparent from the following description of exemplary embodiments with reference to the attached drawings.

DESCRIPTION OF THE EMBODIMENTS

Figure 1:
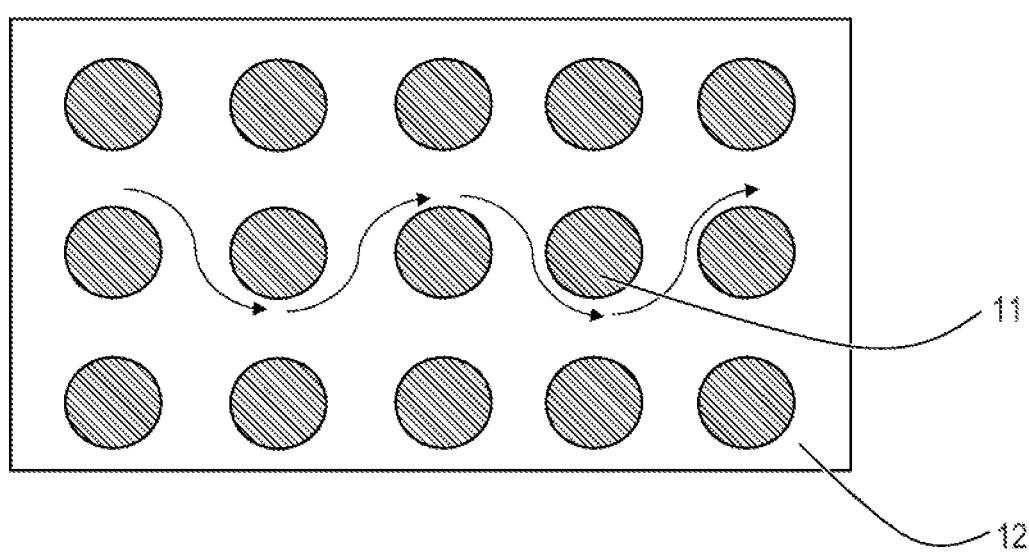
FIG. 1 illustrates an explanatory diagram of a flow of a carrier in an electroconductive elastic body according to the present disclosure.

Preferred embodiments of the present invention will now be described in detail in accordance with the accompanying drawings.

According to studies by the present inventors, the electroconductive elastic body layer according to Japanese Patent Application Laid-Open No. 2002-296930 still has room for improvement in an effect of suppressing a change in the electrical resistance value due to a change in the surrounding environment.

Then, the present inventors have repeated studies to obtain an electroconductive elastic body in which the change in the electroconductivity is small against environmental changes. As a result, the present inventors have found that an electroconductive elastic body having the following structure can further reduce the dependence of the electroconductivity on the environment.

<Structure>

The electroconductive elastic body includes: a cross-linked product of a first ionic electro-conductive rubber, a cross-linked product of a second ionic electro-conductive rubber that is different from the first ionic electro-conductive rubber, and either one or both of a fatty acid and a fatty acid metal salt; wherein the electroconductive elastic body has a matrix that includes the cross-linked product of the first ionic electro-conductive rubber, and a domain that includes the cross-linked product of the second ionic electro-conductive rubber; the cross-linked product of the second ionic electro-conductive rubber includes a polyether skeleton; an electrical resistance of the domain is lower than an electrical resistance of the matrix; in a waveform separation profile of the elastic body as obtained by waveform separation of a scattering profile measured at a temperature of 24° C. by a small-angle X-ray scattering method, a peak top of each of P1 and P2 exists in a range of 1.40 $nm^{-1}$ to 1.60 $nm^{-1}$, and a peak top of P3 exists in a range of 1.85 $nm^{-1}$ to 1.95 $nm^{-1}$, wherein P1 represents a peak attributable to the fatty acid, P2 represents a peak attributable to the fatty acid metal salt, and P3 represents a peak attributable to the cross-linked product of the second ionic electro-conductive rubber; and A2 and A1 satisfy a relationship expressed by the following expression (1):

$$0.005 \leq (A2 \times C2/A1 \times C1) \leq 0.030 \quad (1)$$

wherein A1 represents a sum total of peak areas of P1 and P2, A2 represents a peak area of P3, C1 represents a content (% by mass) of the cross-linked product of the second ionic electro-conductive rubber in the elastic body, and C2 represents a sum total of contents (% by mass) of the fatty acid and the fatty acid metal salt.

In the waveform separation profile which is obtained by the waveform separation of the scattering profile obtained by the measurement on the elastic body at a temperature of 24° C. by the small-angle X-ray scattering method, the existence of the peak P3 of which the peak top exists in the range of 1.85 $nm^{-1}$ to 1.95 $nm^{-1}$ indicates the existence of a crystal structure that is formed by the polyether skeleton which the second ionic electro-conductive rubber constituting the domain has (hereinafter also referred to as "crystal structure derived from the polyether skeleton"). Here, the present inventors have considered that the peak area A2 of the peak P3 can be a parameter representing a degree of development of the crystal structure derived from the polyether skeleton in the elastic body. Then, the present inventors have normalized the peak area A2 of the peak P3 in the following way with the fatty acid and the fatty acid metal salt contained in the elastic body, and have used the result of the normalization as a parameter that represents the proportion of the crystal structure formed by the polyether skeleton of the second ionic electro-conductive rubber to the second ionic electro-conductive rubber in the elastic body.

In other words, the fatty acid and the fatty acid metal salt having a function of a vulcanization assistant are substantially essential components in unvulcanized rubber mixture, and accordingly are surely contained also in the rubber which has been cured. Then, in the present disclosure, the present inventors have regarded the fatty acid and the fatty acid metal salt as reference substances, and divided the peak area A2 of the peak P3 in the waveform separation profile by the sum total A1 of the peak area of the peak P1 attributable to the fatty acid and the peak area of the peak P2 attributable to the fatty acid metal salt (A2/A1); to thereby determine the ratio of the crystal structure to the fatty acid and the fatty acid metal salt. Next, the present inventors have determined the ratio of the crystal structure due to the polyether skeleton of the second rubber to the second ionic electro-conductive rubber in the electroconductive elastic body, by dividing (A2/A1) by (C1/C2), wherein C2 (wt %) represents the proportion of the total amount of the fatty acid and the fatty acid metal salt in the electroconductive elastic body to the electroconductive elastic body, and C1 (wt %) represents the proportion of the amount of the cross-linked product of the second ionic electro-conductive rubber in the electroconductive elastic body to the electroconductive elastic body. The content described above can be expressed in the following way.

$$[(A2/A1)]/[(C1/C2)] = (A2 \times C2)/(A1 \times C1)$$

As described above, "(A2×C2)/(A1×C1)" which normalizes the peak area of P3 by regarding the fatty acid and the fatty acid metal salt as reference substances is a parameter that does not depend on an absolute amount of the second ionic electro-conductive rubber in the elastic body.

In addition, the present inventors have found that when the value of "(A2×C2)/(A1×C1)" is 0.005 or larger and 0.030 or smaller, the dependence of the electroconductivity of the electroconductive elastic body on the environment can be further reduced. The value of "(A2×C2)/(A1×C1)" is preferably 0.007 or larger and 0.020 or smaller.

The present inventors consider the reason why the electroconductive elastic body according to the present disclosure can reduce the dependence of the electroconductivity on the environment, in the following way. As described above, it is considered from the result of the small-angle X-ray scattering measurement (SAXS) that in the domain of the elastic body according to the present disclosure, the crystal structure derived from the polyether skeleton of the second ionic electro-conductive rubber is formed.

It is considered that the domain 11 having the crystal structure derived from the polyether skeleton which the second ionic electro-conductive rubber has exists in the matrix having higher electrical resistance than that of the domain, in a dispersed state, and that this allows a carrier to easily move along the interface between the matrix and the domain (hereinafter also referred to as "MD"), as indicated by the arrow in FIG. 1. In general, mobility of an ion conductive agent decreases in a medium, and accordingly the electroconductivity decreases in a low-temperature/low-humidity (hereinafter, referred to as "LL") environment. However, it is considered that in a structure according to the present disclosure, the domain has the crystal structure, which makes the MD interface clearer, and that the movement of the carrier along the MD interface is unlikely to be affected by the surrounding environment and the deterioration of a polymer. As a result, it is considered that the decrease in the electroconductivity is unlikely to occur even under the low-temperature/low-humidity environment and at the time of conducting deterioration. FIG. 1 illustrates an explanatory diagram of an MD structure which has appeared in a cross section in a thickness direction of an electroconductive elastic body layer according to one aspect of the present disclosure.

The volume resistivity of the electroconductive elastic body according to the present disclosure may be appropriately adjusted, according to the use of the electroconductive elastic body. For example, when the electroconductive elastic body is used for an electroconductive elastic layer of a charging member, the volume resistivity is adjusted so as to be within a range of preferably $1.0 \times 10^5$ Ω·cm to $1.0 \times 10^{10}$ Ω·cm, and particularly preferably $1.0 \times 10^6$ Ω·cm to $6.0 \times 10^8$ Ω·cm, under an LL environment. The electroconductivity can be adjusted by, for example, the type of the first and second ionic electro-conductive rubbers and a mixed ratio between the first ionic electro-conductive rubber and the second ionic electro-conductive rubber.

The volume resistivity of the electroconductive elastic body can be measured by the following method with an atomic force microscope, for example. Firstly, a sample having a cubic shape 9 µm on a side is cut out from an electroconductive elastic body with a manipulator. Platinum is vapor-deposited on one of the six surfaces of the sample. A direct current power source is connected to the surface on which platinum has been vapor-deposited, and a voltage is applied thereto; and a free end of a cantilever is contacted with an arbitrary point on a surface opposite to the surface on which platinum has been vapor-deposited, and an electric current image is thus obtained through a main body of AFM. In this way, electric current values are measured at 100 arbitrary points on the surface opposite to the surface on which platinum has been vapor-deposited. The volume resistivity is calculated from the top ten data of the measured electric current values, the thickness between the platinum-deposited surface and the surface opposite to the platinum-deposited surface, and a contact area of the cantilever.

In the case of an electrophotographic roller in which the elastic layer including the electroconductive elastic body according to the present disclosure is provided on the outer circumferential surface of an electroconductive substrate, the volume resistivity of the elastic layer can be measured also by the following method. Specifically, a columnar rotating electrode made of copper and having a diameter of 30 mm and a width of 20 mm is connected to an arbitrary position of the electrophotographic roller by applying a constant pressure; and the electrophotographic roller is rotated to thereby rotate the rotating electrode according to the rotational movement of the electrophotographic roller. Furthermore, a voltage between both ends of a reference resistor which has been connected in series to the rotating electrode is measured, in a state in which a direct current voltage is applied to an electroconductive shaft core of the electrophotographic roller by an external power source. Thus, a value of an electric current that flows through a region specified by the rotating electrode and a contact surface of the electrophotographic roller in the electroconductive elastic layer of the electrophotographic roller is obtained. An area of the contact surface is about 0.05 to 0.2 cm$^2$, though depending on the hardness of the electroconductive elastic layer.

A number of rotations of the electrophotographic roller is set at 30 rpm, a sampling frequency of the data is set at 20 Hz, and the electrical resistance value of the reference resistor is set at 1 kΩ, for example. In addition, as for the applied voltage, for example, a fixed voltage is set between 10 and 200 V so that the electric current value is 0.1 mA. Then, the rotating electrode is sequentially moved in the longitudinal direction of the roller, and the electric current is measured in a plurality of regions, while the electrophotographic roller is rotated. Then, the volume resistivity (Ω·cm) of each region is calculated from the measured electric current value, the contact area between the electrophotographic roller and the rotating electrode, the thickness of the elastic layer of the electrophotographic roller, and the voltage applied to the elastic layer; and subsequently, an arithmetic average value of the volume resistivities in the respective areas is determined.

The electroconductive elastic body according to the present disclosure will be described below in detail, by way of an electrophotographic member as an example. However, the use of the electroconductive elastic body according to the present disclosure is not limited to the electrophotographic member. In addition, a charging member having a roller shape (hereinafter, also referred to as "charging roller") will be described as an exemplary electrophotographic member, but the electrophotographic member according to the present disclosure is not limited to the charging member, and can be applied to an electrophotographic member that can include an elastic layer having electroconductivity, such as an electrophotographic belt which is used for an intermediate transfer belt, or a developing member.

<Electrophotographic Member>

Figure 2A:
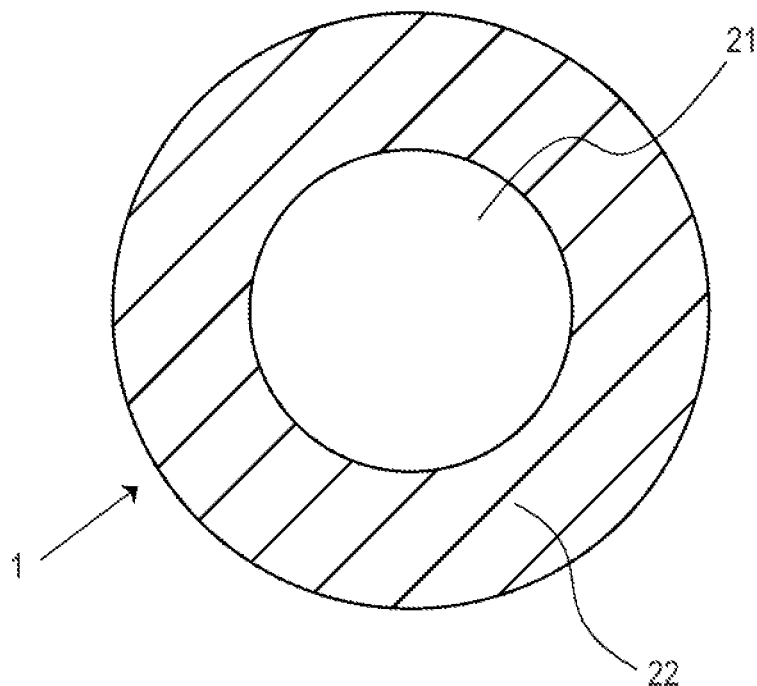
FIG. 2A is a view illustrating one example of an electro-conductive member for electrophotography according to one aspect of the present disclosure.

The charging roller 1 according to one aspect of the present disclosure has an electroconductive elastic layer 22 (hereinafter, simply referred to as an elastic layer, in some cases), on a peripheral surface of an electroconductive substrate (electroconductive shaft core) 21, as a cross-sectional view illustrated in FIG. 2A. The elastic layer includes the electroconductive elastic body described above.

Note that another layer such as a surface layer may be further provided on the elastic layer, as needed, The volume resistivity (hereinafter, simply referred to as resistivity, in some cases) of the charging roller is preferably controlled in a range of $1\times10^6$ Ω·cm to $1\times10^8$ Ω·cm. When the volume resistivity is $1\times10^6$ Ω·cm or higher, a braking property for an electric current can be further improved. In addition, when the volume resistivity is $1\times10^8$ Ω·cm or lower, the charging roller can pass a sufficient electric current for functioning as the electroconductive electrophotographic member.

<Electroconductive Substrate>

The electroconductive substrate used can be appropriately selected from substrates known in the field of electroconductive members for electrophotography as long as the effects of the present disclosure can be obtained. For example, in the case of the electroconductive shaft core, the substrate is a column made of a carbon steel alloy of which the surface is plated with nickel having a thickness of about 5 μm. In addition, onto the substrate, an electroconductive adhesive (pressure sensitive adhesive) may be applied.

<Elastic Layer>

The elastic layer preferably has a low hardness (where, for example, the modulus of elasticity of the elastic layer is 1 MPa or higher and 100 MPa or lower) in order to ensure uniform contact with the photosensitive member, in addition to having uniform semiconductivity in order to uniformly charge a body to be charged. In addition, in order to obtain ionic conductivity, the elastic layer preferably has molecular mobility, and because of this, in pulse NMR measurement, the hydrogen nuclear spin-spin relaxation time at a temperature of 50° C. is preferably 400 μs or longer and 1000 μs or shorter.

[Matrix]

(First Ionic Electro-Conductive Rubber)

The elastic layer has a matrix including a cross-linked product of a first ionic electro-conductive rubber (hereinafter, simply referred to as "first rubber"). The first rubber is not particularly limited, as long as the cross-linked product of the ionic electro-conductive rubber can form a matrix containing the first rubber by being blended with the second ionic electro-conductive rubber in a predetermined ratio, which will be described later. As the first rubber, a rubber composition known in a field of the electroconductive member for electrophotography can be suitably used, according to desired physical properties. Examples thereof include natural rubber, vulcanized natural rubber, and synthetic rubber.

Examples of the synthetic rubber include one or more rubbers selected from the group consisting of acrylonitrile butadiene rubber (NBR), epichlorohydrin rubber, ethylene-propylene rubber and chloroprene rubber. Among the examples, NBR, modified rubber thereof, and chloroprene rubber are preferably used, because diene-based rubber itself, which contains a double bond in the main chain, is satisfactory for electrification. In addition, NBR can be particularly preferably used, because of being less deteriorated by heat generated during kneading.

These rubbers can contain blending agents generally used for rubber, including a filler, a softening agent, a processing assistant, a tackiness imparting agent, an anti-tackiness agent, a dispersion agent, a foaming agent, an electroconductivity aid, a roughening particle and others, as long as that does not impair the effects of the present disclosure. In addition, a vulcanizing agent, a vulcanization assistant or a vulcanization accelerator can also be added. The content of these blending agents in the rubber for the matrix is preferably 0.1 parts by mass or more and 100 parts by mass or less with respect to 100 parts by mass of the first rubber raw material, though depending on a raw material rubber to be selected.

(Electrical Resistance (Volume Resistivity) of Matrix)

The volume resistivity of the matrix is preferably $1.0\times10^7$ to $1.0\times10^{13}$ Ω·cm under an environment of a temperature of 15° C. and relative humidity of 10% (hereinafter referred to as "LL environment"). Such a range of volume resistivity contributes to satisfactory movement of the carrier in the MD interface.

(Measurement Method of Volume Resistivity of Matrix)

The volume resistivity of the matrix can be measured by: cutting out a lamina having a predetermined thickness containing a matrix-domain structure, from the electroconductive elastic body; and contacting a micro-probe of a scanning probe microscope (SPM) or an atomic force microscope (AFM) with the matrix in the lamina. Specifically, a lamina having a thickness of 1 μm, in which a cross section in the entire thickness direction of the elastic body appears, is cut out from the elastic body with a sharp razor, a microtome, a focused ion beam (FIB) or the like. The cut-out lamina is placed on a metal plate so that one surface corresponding to the cross section of the lamina comes in contact with the surface of the metal plate. Then, the cantilever of the SPM is contacted with a portion corresponding to the matrix, on the surface of the lamina opposite to the surface in contact with the surface of the metal plate. Subsequently, a voltage of +50 V, for example, is applied to the cantilever, and the electric current value is measured. In addition, a surface shape of the lamina is observed with the SPM, and the thickness of the measured portion is calculated from an obtained height profile. Furthermore, an area of a concave part of the contact portion of the cantilever is calculated from the observation result of the surface shape. The volume resistivity is calculated from the thickness and the area of the concave part. This operation is performed on 20 laminas cut out from an arbitrary position of the electroconductive elastic body, and an arithmetic average value of the volume resistivities calculated from each of the laminas is determined as the volume resistivity of the matrix of the electroconductive elastic body.

[Domain]

(Second Ionic Electro-Conductive Rubber Material)

The elastic layer has a domain containing a cross-linked product of the second ionic electro-conductive rubber (hereinafter, simply referred to as "second rubber"). A raw material of the second rubber is not particularly limited, as long as the raw material can form a domain containing the second rubber by being blended with a raw material of the first rubber in a predetermined ratio, and is an ionic electro-conductive rubber having the polyether skeleton. For example, a rubber material of which the polyether skeleton is incorporated into the rubber material as described in the above item "[matrix] (first ionic electro-conductive rubber)" can be used, as long as it is incompatible with the first rubber material.

Examples of the second rubber material include one or more polymers selected from epichlorohydrin-ethylene oxide-allyl glycidyl ether terpolymer ("Epichlomer" series produced by Osaka Soda Co., Ltd.) and polyether-based synthetic rubber ("Zeospan" series produced by Zeon Corporation).

Material viscosity can also be adjusted by appropriately blending liquid rubber (for example, liquid NBR (trade name: NIPOL1312, produced by JSR Corporation)), as the second rubber raw material. In addition, the second rubber material forming the domain can contain the above described rubber blending agent as long as that does not impair the effect of the present disclosure, as in the case of the first rubber material. In addition, a vulcanizing agent, a vulcanization assistant or a vulcanization accelerator can also be added.

(Combination Between First Ionic Electro-Conductive Rubber and Second Ionic Electro-Conductive Rubber)

A combination of NBR and the epichlorohydrin-ethylene oxide-allyl glycidyl ether terpolymer is particularly preferable as a combination between the first ionic electro-conductive rubber contained in the matrix and the second ionic electro-conductive rubber contained in the domain. In an electroconductive elastic body according to the present disclosure in which the matrix and the domain include the NBR and the epichlorohydrin-ethylene oxide-allyl glycidyl ether terpolymer, respectively, variation in the volume resistivity is unlikely to occur even when the direct current voltage has been continuously applied thereto over a long period of time. Because of this, the charging member provided with the electroconductive elastic layer including the electroconductive elastic body according to the present disclosure can highly suppress the change in the quality of the electrophotographic image, even when the charging member has been supplied for the formation of the electrophotographic image over a long period of time.

(Electrical Resistance (Volume Resistivity) of Domain)

The volume resistivity of the domain is preferably $1.0 \times 10^5$ Ωcm or larger and $1.0 \times 10^8$ Ωcm or smaller under the LL environment, in order that the carrier smoothly moves in the MD interface. The electrical resistance of the domain can be appropriately adjusted by the type of second ionic electro-conductive rubber, a proportion of the polyether structure in the molecule, the contents, and others.

(Measurement Method of Volume Resistivity of Domain)

The volume resistivity of the domain can be measured in the same manner as the measurement method of the volume resistivity of the above matrix, except that the contact position of the cantilever is on the domain. In addition, for the volume resistivity of the domain according to the present disclosure, 20 domains in a lamina are arbitrarily selected, the volume resistivity is measured for each of the domains, and the arithmetic average value is determined, which is used as the volume resistivity of the domain of the electroconductive elastic body.

(Comparison of Electrical Resistance Between Matrix and Domain)

As described above, the matrix has a higher electrical resistance than the domain. Specifically, the volume resistivity of the matrix is preferably 5 or more times, and particularly preferably 10 or more times, as large as the volume resistivity of the domain, in order that the carrier easily flows not in the matrix but in the interface with the domain.

(Uniform Dispersibility of Domain)

In general, the carrier resists flow in the inner part of the electroconductive rubber portion in the low-temperature/low-humidity environment. However, the elastic body layer according to the present disclosure is configured such that the carrier is movable along the MD interface, whereby the environment dependence of electroconductivity can be reduced. Such an effect can be highly exhibited, as the domains exist more uniformly in the elastic body layer. Then, in the present disclosure, the uniformity of the existence state of the domain in the elastic body layer has been evaluated by the following method.

(Evaluation Method of Uniformity of Existence State of Domain)

A volume fraction of the domain is obtained from a three-dimensional image of a sample collected from the elastic body layer, the three-dimensional image being reconstructed from a plurality of cross-sectional images of the sample acquired with FIB-SEM, for example. The FIB-SEM is a composite apparatus including an FIB (Focused Ion Beam) apparatus and an SEM (scanning electron microscope).

Figure 2B:
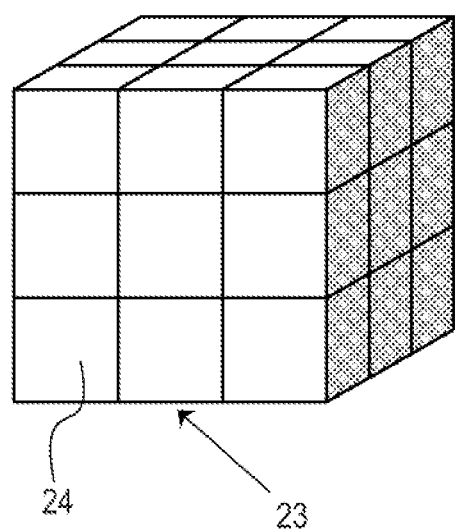
FIG. 2B illustrates an explanatory diagram of a cube and a unit cube which are used for evaluation of an existence state of a domain in the electroconductive elastic body according to one aspect of the present disclosure.

Specifically, samples of a cubic shape 9 μm on a side are collected from a plurality of portions of the elastic body layer. For example, in the case of an elastic body layer having a roller shape and having a length L in the direction orthogonal to the circumferential direction, samples from positions at every 120° in the circumferential direction in three portions (1/4)L, (2/4)L, and (3/4)L away from one end, i.e., nine samples in total, can be collected. Subsequently, for each sample, exposure of the cross section with the FIB, and photographing of the SEM image of the exposed cross section are repeated, and a group of slice images is obtained. The slice interval is, for example, 60 μm. From the obtained group of the slice images, a three-dimensional image is reconstructed using 3D visualization/analysis software. Examples of the 3D visualization/analysis software include "Avizo" (trade name, manufactured by Thermo Fisher Scientific). Subsequently, in the obtained three-dimensional image, the cube 9 μm on a side is divided into 27 unit cubes each 3 μm on a side (see FIG. 2B), and the volume Vd of the domain included in each unit cube is calculated. Then, the arithmetic average value of Vd, Vd(avg), of each unit cube is obtained, and the number of unit cubes that has a Vd within a range of Vd(avg)±2.7 μm³ is obtained. Then, when the number is 25 or more, it can be said that the domains exist extremely uniformly in the elastic body layer (rank I). When the number is 22 to 24, it can be said that the domains uniformly exist in the elastic body layer (rank II). When the number is 20 to 21, it can be said that the domains relatively uniformly exist in the elastic body layer (rank III). In addition, when the number is 15 or less, it cannot be said that the existence state of the domain in the elastic body layer is uniform (rank IV).

In other words, in the present disclosure, when a sample of a cubic shape 9 μm on a side collected from an elastic body layer is divided into 27 unit cubes 3 μm on a side, followed by calculating the average value Vd(avg) of volumes Vd of domains included in each unit cube, the number of unit cubes that has a Vd within a range of Vd(avg)±2.7 μm is preferably 20 or more. When this condition is satisfied, the elastic body can have highly uniform its electroconductivity.

(Size of Domain)

It is considered that the carrier moves in the MD interface in the electroconductive elastic body according to the present disclosure to thereby develop stable electroconductivity with less environment dependence. Because of this, there are preferably many interfaces between the matrix and the domain. For this purpose, the size of the domain is preferably smaller. For example, suppose that there are 100 spherical domains having a radius of r, in a unit volume of the electroconductive elastic body. The surface area per domain is $4\pi r^2$ wherein r represents the radius. In the case where the radius of the domain changes to r/2, the number of domains that can exist in the cube changes to 800, which is eight times of the original number of the domains. Because of this, the total sum of the areas of the interfaces is doubled (½×½×8). In addition, since the number of domains increases, the inter-domain distance inevitably decreases. In other words, it is effective for obtaining high electroconductivity and uniformity of the electroconductive elastic body to make fine domains uniformly existing in unit volumes.

In the present disclosure, the size of the domain is the maximum Feret's diameter of the domain, which has been determined by the following method. Firstly, a sample including a cross section in the thickness direction of the elastic body is collected from the elastic body. Platinum is vapor-deposited on the surface corresponding to the cross section of each of the obtained samples. Subsequently, the platinum-deposited surface is photographed using a scanning electron microscope (trade name: S-4800, manufactured by Hitachi High-Tech Corporation) at a magnification of ×5000 to obtain an SEM image. Each of the SEM images is converted into an 8-bit grayscale using image processing software (trade name: Image Pro Plus, produced by Media Cybernetics) to obtain a monochrome image with 256 gradations. Subsequently, the black and white of the image is inverted so that a portion corresponding to the domain in the monochrome image becomes white, and a threshold value for binarization is set based on an algorithm of Otsu's discriminant analysis method for the luminance distribution of the image; and a binarized image is obtained. In the obtained binarized image, an observation region having a square shape 15 μm on a side is placed in each of arbitrary three portions. 50 domains are arbitrarily selected from the domains existing in the observation region, and the maximum Feret's diameter is calculated using a counting function of the above image processing software. The average value of the maximum Feret's diameter obtained from each observation region is the size of the domain. The sample from the elastic body may be collected from a plurality of portions, and in this case, the arithmetic average value of the maximum Feret's diameter obtained from all observation regions is the size of the domain of the elastic body.

Specifically, the size of the domain in the cross section is preferably 0.1 to 2 μm or smaller, more preferably is 1 μm or smaller, and further preferably is 0.5 μm or smaller. In particular, when the size is 0.4 μm or smaller, an extremely high effect in the present disclosure can be expected. However, if the size is smaller than 0.1 μm, such a size is inappropriate because the compatibility is high to result in an insufficient interface effect. The size of the domain indicates a diameter in an equivalent circle diameter. In addition, the average domain size indicates a domain size of an area-weighted average.

Here, it is known that when two types of incompatible rubbers are mixed to form a matrix/domain structure, the size of the domain can be expressed by, for example, the following theoretical formula.

$$D=[C\sigma/\eta 0\gamma\cdot]\times f(\eta 0/\eta)$$

D: diameter of dispersed particle (particle diameter of domain), σ: interfacial tension, η0: matrix viscosity, η: viscosity of dispersion phase (viscosity of domain), C: constant, and γ·: shear velocity.

In other words, in the present disclosure, examples of methods for reducing the size of the domain to uniformly disperse the domains include the following three methods.

(Method A) Selecting a combination of the first rubber and the second rubber so that the interfacial tension between the first rubber and the second rubber is reduced.

(Method B) Selecting a combination of the first rubber and the second rubber such that the viscosities thereof are close to each other.

(Method C) Increasing the shear velocity at the time of dispersion of the second rubber to the first rubber.

Method A: In view of uniformly dispersing the domains in the matrix, it is preferable to select such a combination as to decrease the difference between solubility constants (Solubility Parameter: SP value) of the first rubber and the second rubber. In addition, examples of a method for reducing the interfacial tension include addition of a compatibilizer. When a difference between the SP values is too small, the compatibility becomes too high, and there is a case where the matrix/domain structure is not stably formed.

Method B: In view of uniformly dispersing the domains in the matrix, it is preferable to select materials for the first rubber and the second rubber such that the viscosities thereof are close to each other at a temperature at the time when the materials are mixed. Here, it is also effective to use a liquid nitrile rubber or the like as a part of the second ionic electro-conductive rubber for forming the domain.

Method C: In view of uniformly dispersing the domains in the matrix, it is effective to increase the shear velocity and extend the shear time period at the time when the two rubbers are mixed. In addition, for developing the crystal structure in the domain and allowing the carrier to move in the MD interface more, it is effective to use an extensional shear method when the two types of rubbers are mixed, as will be described later.

[Production Method of Electroconductive Elastic Body]

The production method of the electroconductive elastic body according to the present disclosure will be described, which has been described so far.

Firstly, an unvulcanized first ionic electro-conductive rubber and an unvulcanized second ionic electro-conductive rubber are provided. Here, the first rubber and the second rubber can be appropriately selected in consideration of the respective SP values and the viscosities at the time of kneading, according to, for example, the Methods A to C for adjusting the size of the domain. In addition, it is necessary to use a rubber having the polyether skeleton in the molecule, as the second rubber. In addition, the production method includes the step of applying extensional shear to a raw material rubber mixture that contains the first ionic electro-conductive rubber, the second ionic electro-conductive rubber, and either one or both of a fatty acid and a fatty acid metal salt. In this manner, an unvulcanized rubber mixture having the MD structure can be obtained in which domains of the second ionic electro-conductive rubber are dispersed in the matrix of the first ionic electro-conductive rubber, and in which the crystal structure derived from the polyether skeleton of the second ionic electro-conductive rubber is formed in the domains. Subsequently, the first ionic electro-conductive rubber and the second ionic electro-conductive rubber are cured, to thereby produce the electroconductive elastic body according to the present disclosure.

The blending ratio of the unvulcanized first ionic electro-conductive rubber to the unvulcanized second ionic electro-conductive rubber is preferably 10:90 to 90:10 (parts by mass), and is more preferably 20:80 to 80:20 (parts by mass). Here, the total of the raw materials of the first ionic electro-conductive rubber and the second ionic electro-conductive rubber is 100 parts by mass.

As the fatty acid and the fatty acid metal salt, those used as a molding aid (mainly a lubricant) or a vulcanization assistant in the rubber material field can be used. A long chain fatty acid and a metal salt thereof are preferable, and stearic acid, zinc stearate, calcium stearate and the like are more preferable materials. These may be used singly or in combination of two or more thereof. When the total amount of the raw materials of the above first and second ionic electro-conductive rubbers is 100 parts by mass, the amount of the fatty acid and the fatty acid metal salt blended can be within a range preferably of 0.1 to 10 parts by mass, and particularly preferably of 0.5 to 5 parts by mass. In addition, the blending agents for various rubbers can be blended.

An unvulcanized first rubber and an unvulcanized second rubber are kneaded. At this time, it is important to orient the polyether skeleton by applying a strong shearing force to the unvulcanized second rubber. In other words, when the shear is applied to the ionic electro-conductive rubber having the polyether skeleton, the polymer chains are oriented, and a crystal structure derived from the polyether skeleton can be produced. As a result, the electroconductive elastic body can be obtained in which the domains of the second ionic electro-conductive rubber are dispersed in the matrix of the first ionic electro-conductive rubber, and in which the crystal structure derived from the polyether skeleton is produced in the domains.

Here, the crystal structure derived from the polyether skeleton can be easily returned to an amorphous state or be gelated by heat, particularly heat caused by shearing. Specifically, the amount of the crystal structures produced by applying the shearing force to the second rubber can be expressed by, for example, the following mathematical expression (2).

$$A = \int F(Q(t))dt - \int G(T(t)-T0)dt - H(T0)tf \qquad (2)$$

A: amount of crystal structure,
F(Q): function of production of crystal structure per unit time,
G(T(t)−T0): function of extinction of crystal structure per unit time,
H(T0): correction function of extinction of crystal structure per unit time,
T(t): polymer temperature at time t,
T0: initial set temperature,
Q(t): shearing stress at time t, and
t: time.

The integral range is from 0: start time of kneading, to tf: end time of kneading. The case in which A is negative means that the crystal structure is not formed.

Accordingly, in view of forming the MD structure which contains the domain containing the crystal structure derived from the polyether skeleton, it is preferable to mix the unvulcanized rubber mixture containing the first ionic electro-conductive rubber and the second ionic electro-conductive rubber, while suppressing heat generation and applying the strong shear. In this regard, it is particularly preferable to use a mixing method including an extensional shearing step, in view of entropy elasticity peculiar to rubber such that rubber is chilled when being extended. The mixing method will be described in detail below.

<Study of Kneading Method>
(Comparison Between Dispersion Apparatus with Simple Shearing and Dispersion Apparatus with Extensional Shearing)

As a mixing apparatus to be used in a kneading process of the unvulcanized first ionic electro-conductive rubber and the unvulcanized second ionic electro-conductive rubber, a rubber mixing apparatus using simple shearing (for example, a pressure kneader, an open roll, or the like) and a biaxial kneading extruder which can apply a larger shearing force are known, for example. However, it is difficult for these apparatuses to apply a shearing force for producing a sufficient amount of crystal structures by orienting the polyether skeleton in the second ionic electro-conductive rubber, when producing the electroconductive elastic body according to the present disclosure. In addition, even if a sufficient shearing force can be applied, it is necessary to cope with heat which is generated concomitantly. On the other hand, a kneading machine equipped with an extensional shear screw, which can apply the extensional shear, can finely disperse the second ionic electro-conductive rubber in the first ionic electro-conductive rubber, and also apply the sufficient shearing force to the second rubber, which can form the crystal structure derived from the polyether skeleton.

The shear applied to the rubber mixture by a general pressure kneader, an open roll, or a biaxial kneading extruder is so-called "simple shearing", and is a method of gradually finely crushing and dispersing a material. On the other hand, the extensional shearing is a method of kneading a material while finely stretching and splitting the material. Accordingly, when the mixing method including the extensional shearing step is used, it is easy to obtain the MD structure in which domains that are fine and have a uniform size are dispersed in a matrix. In addition, rubber exhibits entropy elasticity, and accordingly in the extensional shearing step, the rubber absorbs heat by being stretched. As a result, heat generation is unlikely to occur even by kneading, and accordingly, the change of the crystal structure derived from the polyether skeleton to be formed by the extensional shear into an amorphous state due to heat can be effectively suppressed. On the other hand, even the mixing method including the simple shearing step can form the crystal structure derived from the polyether skeleton, by appropriately removing heat which is generated by the simple shearing.

Here, the present inventors have investigated the production of the MD structure according to the present disclosure, using a biaxial kneading extruder that can achieve high shear velocity that is difficult to be achieved by a pressure kneader or an open roll that is used for mixing of rubber by the simple shear. Specifically, "KZW15TW-4MG-NH (−6000) (product name)" manufactured by Technovel Co., Ltd. was used as the biaxial kneading extruder. However, even by using such a biaxial kneading extruder, gelation of the rubber and re-agglomeration occurred to fail in finely dispersing the domains of the second ionic electro-conductive rubber in the matrix, and it was difficult to form the crystal structure derived from the polyether skeleton of the second ionic electro-conductive rubber.

As described above, mechanisms of the extensional shear and the simple shear are greatly different from each other. Specifically, the shear flow in the simple shear is a flow in which the material is torn by a velocity gradient, and on the other hand, the extensional flow in the extensional shear is a flow in which the material is stretched in a main stress direction. In the journal "Molding Process, Vol. 23, No. 2, pp. 72-77 (2011)", Kajihara et al. reported the following results in Newtonian fluid/Dispersion system of Newtonian fluid. In a field of the simple shear flow, the viscosity ratio is preferably about 1; however, in the extensional flow, the droplets are stretched and divided regardless of the viscosity ratio, and the droplets can be finely dispersed even in a system in which the viscosity ratio is about 5 or larger. This means that "even if the viscosity ratio of the materials is larger, the material is easily dispersed in the extensional shear". It is considered that also in a blend material system of a viscoelastic body in the present disclosure, the above "easy-to-divide" effect similarly works to thereby uniformly disperse the raw material of the second rubber in the matrix of the raw material of the first rubber.

Figure 3A:
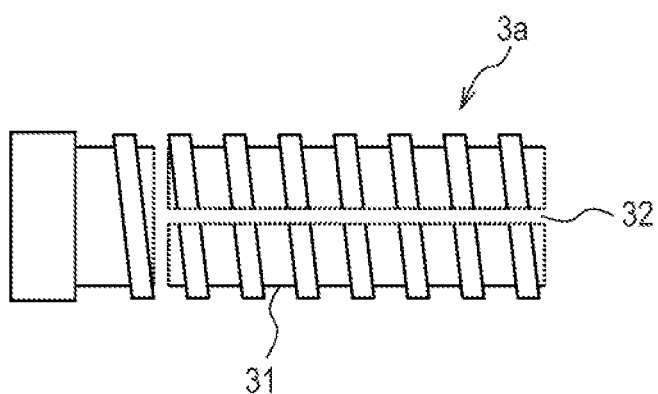
FIG. 3A illustrates a schematic cross-sectional view of one aspect of an apparatus for imparting an extensional shearing force to a rubber mixture, which can be used in the manufacture of an electroconductive elastic body according to the present disclosure.
Figure 3B:
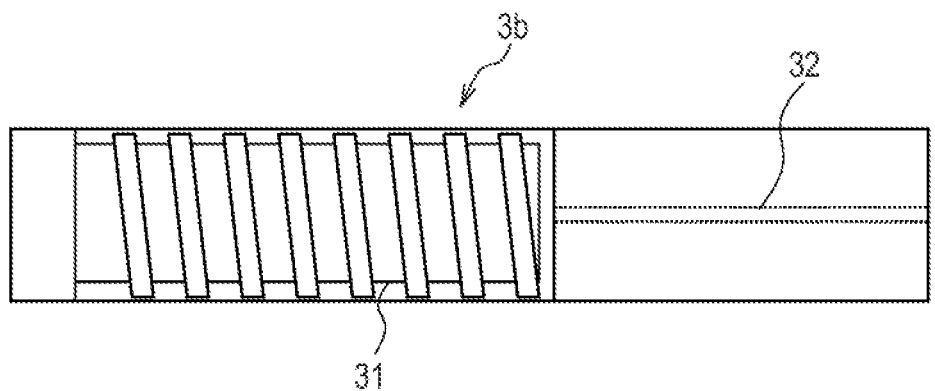
FIG. 3B illustrates a schematic cross-sectional view of one aspect of an apparatus for imparting an extensional shearing force to a rubber mixture, which can be used in the manufacture of the electroconductive elastic body according to the present disclosure.

For the mixing including the extensional shearing step, it is preferable to use a kneading apparatus provided with an apparatus for imparting extensional shearing force as illustrated in FIG. 3A and FIG. 3B. FIG. 3A and FIG. 3B illustrate schematic cross-sectional views of two embodiments of the apparatus for imparting extensional shearing force. The apparatus 3a for imparting extensional shearing force illustrated in FIG. 3A has a fine canal 32 in the inner part of the screw 31. The apparatus 3a for imparting extensional shearing force is used for kneading in a so-called batch circulation system. The apparatus 3b for imparting extensional shearing force illustrated in FIG. 3B includes the fine canal 32 adjacent to the screw 31, in the downstream side of the screw 31. The extensional shearing force imparting mechanism 3b is used for a so-called continuous system of kneading.

In a kneading apparatus provided with the apparatus 3a for imparting extensional shearing force, the rubber mixture reaches the front end (right end in FIG. 3A) of the screw 31, and then is returned to the rear end of the screw 31 through the hole of the fine canal 32 at the front end of the screw 31. Because of this, the rubber mixture repeatedly passes through the fine canal 32, and in this process, the extensional shearing force is imparted to the rubber mixture in the fine canal 32. In addition, the rubber composition can be continuously retained in the extensional shear field, and accordingly a large shearing force can be imparted to the rubber composition in a short period of time. On the other hand, in a kneading apparatus provided with an extensional shear imparting mechanism 3b, the rubber mixture which has been kneaded in the screws 31 is continuously introduced into the fine canal 32, and the extensional shearing force is imparted to the rubber mixture in a process in which the rubber mixture passes through the fine canal 32.

The diameter of the fine canal 32 is preferably larger than 0.5 mm and is preferably 5.0 mm or smaller, for example. The diameter is particularly preferably 1.0 to 3.0 mm. The fine canal having such a diameter can further surely apply the extensional shearing force to the rubber mixture. The number of holes of the fine canal is not particularly limited, as long as the uniform dispersion of the desired domain can be achieved. In addition, here, the fine canal is given as an example of a specific unit for imparting the extensional shearing force, but the unit is not limited to the fine canal, as long as the structure can similarly provide the extensional shear effect; and for example, a double cylindrical structure can also be used. Examples of the kneading apparatus that has adopted the batch circulation system include an extensional shearing apparatus (micro shearing apparatus: manufactured by Imoto machinary Co., Ltd.) and a high-speed shearing apparatus (manufactured by Niigata Machine Techno Co., Ltd.). In addition, examples of an apparatus of the continuous system include an apparatus in which an extensional shear imparting mechanism 3a of the apparatus of the above batch circulation system is modified to the extensional shear imparting mechanism 3b. In addition, an apparatus described in BANDO TECHNICAL REPORT No. 18/2014, pp. 4-7, for example, can also be used as appropriate.

In the kneading and extensional shearing step of the rubber mixture, it is preferable to control a temperature of the rubber mixture to 170° C. or lower. This is because such a controlled temperature contributes to fine and uniform dispersion of the raw material of the second rubber into the raw material of the first rubber, and to formation and maintenance of the crystal structure derived from the polyether skeleton of the raw material of the second rubber. When the temperature of the rubber mixture which is being kneaded is measured with a thermocouple, there is a tendency that the temperature is found to be lower than the temperature measured with an infrared temperature sensor. Because of this, it is preferable to accurately control the temperature of the rubber mixture using an accurate material temperature measurement function (IR sensor). In addition, it is also preferable to add, to the kneading apparatus, a chiller that can control a temperature from room temperature to −20° C., for coping with heat generated when the rubber mixture is kneaded.

As described above, in the production of the electroconductive elastic body according to the present disclosure, it is preferable to include a step of applying the extensional shear to the rubber mixture. Specifically, a particularly preferable production method of the electroconductive elastic body according to the present disclosure is a production method including the following steps (1) and (2).

(1) kneading a rubber mixture containing a first ionic electro-conductive rubber, a second ionic electro-conductive rubber, and either one or both of a fatty acid and a fatty acid metal salt while applying extensional shear thereto, to thereby obtain an unvulcanized rubber mixture; and (2) curing the unvulcanized rubber mixture.

However, the production method for the electroconductive elastic body according to the present disclosure is not limited to the above method. For example, even by a method involving the use of a conventional pressure kneader, the crystal structure derived from the polyether skeleton of the second ionic electro-conductive rubber can be formed when the extensional shearing force is imparted to the second ionic electro-conductive rubber by adjusting the number of rotations of the blade or the kneading time period. In addition, the crystal structure once formed can be maintained by controlling a temperature of the rubber mixture which is being kneaded to 170° C. or lower. As a result, the electroconductive elastic body according to the present disclosure can also be formed using a pressure kneader.

<Manufacturing Method of Electrophotographic Member>

The electrophotographic member according to the present disclosure can be manufactured via the steps of:

(1) kneading a rubber mixture that contains the first ionic electro-conductive rubber, the second ionic electro-conductive rubber, and either one or both of a fatty acid and a fatty acid metal salt, while applying extensional shear thereto, to thereby obtain an unvulcanized rubber mixture;

(2) forming a layer of the unvulcanized rubber mixture that has been obtained in the above step (1) on the substrate; and (3) curing the layer of the unvulcanized rubber mixture.

<Electrophotographic Image-Forming Apparatus>

Figure 4:
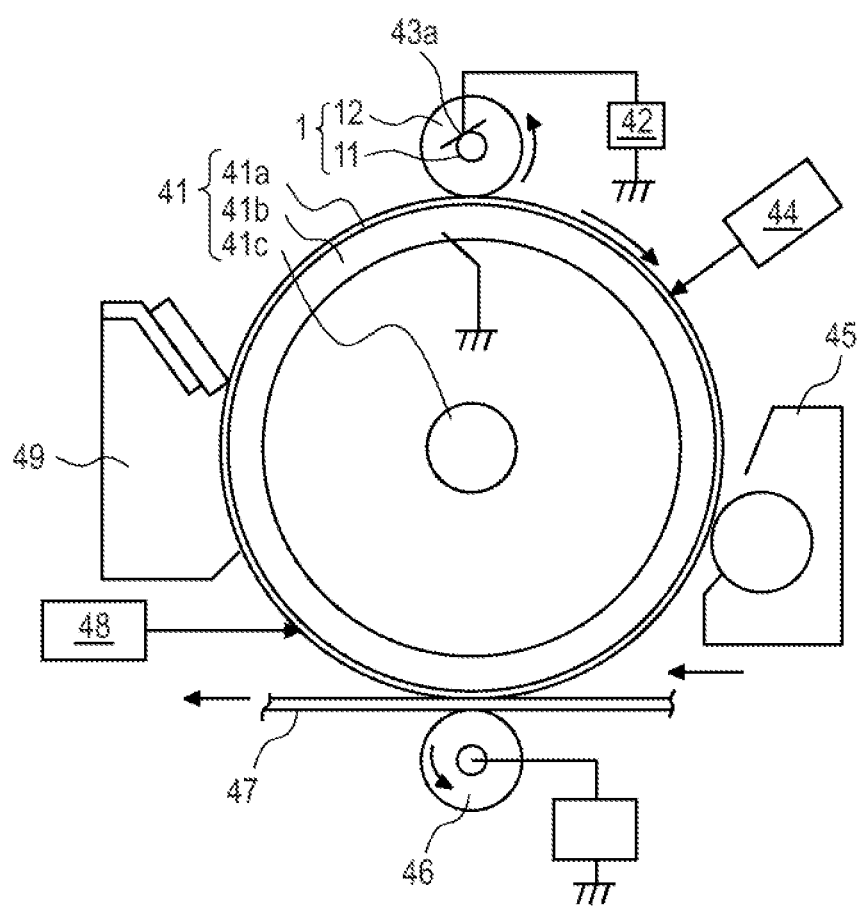
FIG. 4 illustrates a configuration diagram illustrating an electrophotographic image-forming apparatus according to one aspect of the present disclosure.

An electrophotographic image-forming apparatus according to one aspect of the present disclosure (hereinafter simply referred to as "electrophotographic apparatus") includes the electroconductive member for electrophotography according to one aspect of the present disclosure. An example of the electrophotographic apparatus is illustrated in the schematic block diagram in FIG. 4. The photosensitive member 41, which is a body to be charged, has a drum shape in which an electroconductive support 41b having electroconductivity such as aluminum and a photosensitive layer 41a is laminated on the electroconductive support 41b; and the photosensitive member 41 is rotationally driven around a support shaft 41c at a predetermined peripheral speed in a clockwise direction in the figure.

Both ends of an electroconductive shaft core 21 of the charging roller 1 are pressed against the photosensitive member 41 by a pressing unit (not illustrated), and the electroconductive elastic layer to which a direct current (DC) bias is applied by a power source 42 and a rubbing power source 43a via the electroconductive shaft core is arranged so as to come in contact with the photosensitive member 41. As the charging roller is rotated by the rotation of the photosensitive member 41, the photosensitive member 41 is uniformly charged (primarily charged) to a predetermined polarity and electric potential.

Subsequently, an electrostatic latent image corresponding to target image information is formed on a peripheral surface of the photosensitive member that has been exposed to the target image information (exposure by laser beam scanning, slit exposure of the original image, and the like) by the exposure unit 44. The electrostatic latent image on the photosensitive member is formed into a toner image by adhesion of a toner which is supplied by a developing member 45. Subsequently, a transfer material 47 is conveyed from a paper feed portion (not illustrated) to a transfer portion between the photosensitive member 41 and the transfer member 46 in synchronization with the rotation of the photosensitive member 41, and the transfer member to which a polarity opposite to that of the toner image is applied is pressed against the transfer material from the back surface of the transfer material, to thereby sequentially transfer the toner image onto the transfer material 47.

The transfer material 47 to which the toner image has been transferred is separated from the photosensitive member 41, and is conveyed to a fixing unit (not illustrated); the toner image is fixed there; and the resultant transfer material 47 is output as an image formed product. In an electrophotographic apparatus which forms an image on the back side as well, the transfer material 47 is re-conveyed between the photosensitive member 41 and the transfer member 46, by a re-conveying unit, in order to form an image again.

The peripheral surface of the photosensitive member 41 onto which the image has been transferred is subjected to pre-exposure by a pre-exposure apparatus 48, and a residual electric charge on the photosensitive member is removed (diselectrified). As the pre-exposure apparatus 48, a known unit can be used. Preferable examples include an LED chip array, a fuse lamp, a halogen lamp and a fluorescent lamp. A diselectrified peripheral surface of the photosensitive member 41 is submitted to removal of adhering contaminants such as a residual toner after transfer by a cleaning member 49, and is converted into a cleaned surface which is repeatedly used for the image formation.

In the electrophotographic apparatus, the charging roller 1 may be driven by the photosensitive member 41, may be non-rotating, or may also be positively rotationally driven at a predetermined peripheral speed in a forward or reverse direction to a movement direction of the surface of the photosensitive member 41. In the case where the electrophotographic apparatus is used as a copying machine, the exposure may be performed by using reflected light or transmitted light from a document; or by scanning a laser beam, by driving an LED array, or by driving a liquid crystal shutter array, based on a signal which has been read from the document and formed.

Examples of the electrophotographic apparatus of the present disclosure include a copying machine, a laser beam printer, an LED printer, and an electrophotographic application apparatus such as an electrophotographic plate making system.

<Process Cartridge>

Figure 5:
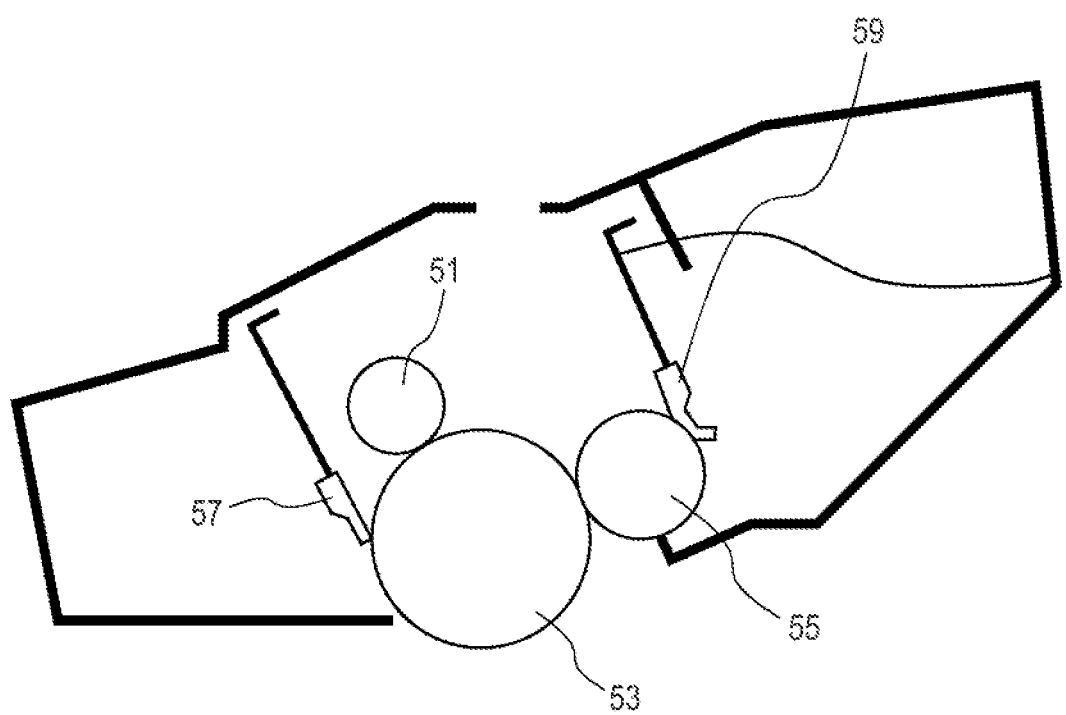
FIG. 5 illustrates a diagram illustrating a process cartridge according to one aspect of the present disclosure.

A process cartridge according to one aspect of the present disclosure includes the electroconductive member for electrophotography according to one aspect of the present disclosure, and is configured to be detachable from a main body of the electrophotographic image-forming apparatus. An example of the process cartridge is illustrated in the block diagram in FIG. 5. The process cartridge includes an electroconductive member having a roller shape according to one aspect of the present disclosure, as a charging roller 51. A drum-shaped electrophotographic photosensitive member (hereinafter, also referred to as "electrophotographic photosensitive drum") 53 is arranged so as to be chargeable by the charging roller 51. Here, specifically, the charging roller 51 is pressed against and contacted with the electrophotographic photosensitive drum 53. In addition, a developing roller 55 for supplying a developing agent for developing an electrostatic latent image which has been formed on the surface of the electrophotographic photosensitive drum 53, and a cleaning blade 57 for removing the developing agent remaining on the peripheral surface of the electrophotographic photosensitive drum 53 are provided.

According to one aspect of the present disclosure, an electroconductive elastic body showing stable electroconductivity can be obtained. According to one aspect of the present disclosure, an electrophotographic member that contributes to the stable formation of a high-quality electrophotographic image can be obtained. In addition, according to one aspect of the present disclosure, a process cartridge that contributes to the stable formation of the high-quality electrophotographic image can be obtained. In addition, according to one aspect of the present disclosure, an electrophotographic image-forming apparatus that can stably form the high quality electrophotograph can be obtained. Furthermore, according to one aspect of the present disclosure, a method for producing the electroconductive elastic body which shows the stable electroconductivity can be obtained. Furthermore, according to one aspect of the present disclosure, a method for producing the electrophotographic member that contributes to the stable formation of the high-quality electrophotographic image can be obtained.

EXAMPLES

Hereinafter, the present disclosure will be described in more detail below with reference to Examples, but the Examples do not limit the present disclosure at all. Note that "part(s)" means "part(s) by mass" unless otherwise specified, and reagents and others used were commercially available products with high-purity unless otherwise specified.

In the Examples, an A-kneaded rubber composition (mixture) refers to an unvulcanized rubber composition (mixture) to which a cross-linking agent or a vulcanization accelerator is not added, and a B-kneaded rubber composition (mixture) refers to an unvulcanized rubber composition (mixture) to which a cross-linking agent or a vulcanization accelerator has been added.

Example 1

(Preparation of Unvulcanized Rubber Mixture)

An A-kneaded rubber composition was obtained by mixing 70 parts of nitrile butadiene rubber (NBR, trade name: Nipol DN631, produced by Zeon Corporation) as a raw material of the first ionic electro-conductive rubber, 30 parts of epichlorohydrin-ethylene oxide-allyl glycidyl ether terpolymer (trade name: Epichlomer ON301, produced by Osaka Soda Co., Ltd.) as a raw material of the second ionic electro-conductive rubber, and 1 part of stearic acid as a processing aid, using a pressure kneader (trade name: TD6-15MDX, manufactured by Toshin Co., Ltd.), under the conditions of a filling rate of 70%, a number of rotations of the blade of 30 rpm, and a mixing time period of 16 minutes.

Subsequently, the above A-kneaded rubber composition was kneaded using a processing machine provided with an apparatus for imparting extensional shearing force as illustrated in FIG. 3A (trade name: NHSS8-28, manufactured by Niigata Machine Techno Co., Ltd.), while an extensional shearing force was imparted thereto. Here, the hole of the fine canal of the screw which was the apparatus for imparting extensional shearing force was set at 2.0 mm. In addition, a temperature of the plasticizing portion was set at 100° C., a temperature of a kneading portion was set at 150° C., the number of rotations of the screw was set at 1000 rpm, and the kneading time period for the A-kneaded rubber composition was set at 5 seconds. In this way, the A-kneaded rubber composition to which the extensional shearing force was applied was obtained. A cooling mechanism was used to control the temperature of the A-kneaded rubber composition which was being kneaded so as not to exceed 170° C., in order to reduce heat generation by shear in extensional shear processing.

Subsequently, a B-kneaded rubber composition was obtained by mixing, with the A-kneaded rubber composition, 1.2 parts of sulfur (trade name: PMC, produced by Tsurumi Chemical Industry Co., Ltd.) as a vulcanizing agent, 1 part of dibenzothiazolyl disulfide (trade name: Nocceler DMP, produced by Ouchi Shinko Chemical Industrial Co., Ltd.) as a vulcanization assistant, and 1 part of tetramethylthiuram monosulfide (trade name: Nocceler TS, produced by Ouchi Shinko Chemical Industrial Co., Ltd.) with an open roll.

Manufacture of Electroconductive Roller

A round bar of free-cutting steel was provided. The round bar had a total length of 252 mm and an outer diameter of 6 mm, and the surface thereof was subjected to electroless nickel plating. Subsequently, an adhesive was applied over the whole circumference in a range of 230 mm in length excluding 11 mm at both ends of the round bar. As the adhesive, an electroconductive hot melt type of adhesive was used. In addition, a roll coater was used for application. The round bar to which the adhesive was applied was used as an electroconductive substrate.

Subsequently, a crosshead extruder was provided. The extruder had a supply mechanism for an electroconductive substrate and a discharge mechanism for an unvulcanized rubber roller. A die with an inner diameter of 12.5 mm was attached to the crosshead. The extruder and the crosshead were adjusted to the temperature of 80° C., and a conveying speed of the electroconductive shaft core was adjusted to 60 mm/sec. Under the conditions, the above-described B-kneaded rubber composition was supplied from the kneading extruder, and a layer of the B-kneaded rubber composition was formed on the outer circumferential surface of the electroconductive substrate in the crosshead, to thereby obtained an unvulcanized rubber roller. Subsequently, the obtained unvulcanized rubber roller was placed in a hot air vulcanization oven at a temperature of 170° C., and was heated for 60 minutes to thereby cure the layer of the B-kneaded rubber composition. After that, an end portion of the cured rubber layer was cut off, whereby a dimension of the rubber layer in a direction orthogonal to the circumferential direction was set at 230 mm. Finally, the surface of the rubber layer was polished by a rotary grindstone, to thereby obtain an electroconductive roller having a crown shape in which each diameter at a position of each 90 mm away from the central portion toward both end portions was 8.4 mm and a diameter at the central portion was 8.5 mm. This electroconductive roller was used as an electrophotographic roller according to Example 1.

<Evaluation>

The obtained electrophotographic member was evaluated in the following way.

"Leica EMUC7" (trade name, manufactured by Leica) was used as a microtome, "Leica EMTIC3X" (trade name, manufactured by Leica) was used as an ion milling, and "Ultra plus" (trade name, manufactured by Carl Zeiss) was used as an SEM, unless otherwise specified. In addition, "Cryo FIB-SEM, Helios G4UC" (trade name, manufactured by Thermo Fisher Scientific) was used to construct a three-dimensional stereoscopic image.

<Evaluation 1: Confirmation of MD Structure>

A lamina was prepared from the elastic layer, and a cross section of the lamina was observed to confirm the existence of the MD structure in the elastic layer. Firstly, a test piece having a cross section parallel to the circumferential direction of the elastic layer was cut out using the microtome. Subsequently, the surface of the test piece corresponding to the cross section of the elastic layer was observed at a magnification of ×10000 with the scanning electron microscope (SEM) (trade name: ULTRA plus, manufactured by Carl Zeiss), and an SEM image was obtained. In the obtained SEM image, the presence or absence of the MD structure was checked. As a result of this evaluation, in the MD structure of the elastic layer according to Example 1, a plurality of domains 11 were dispersed in a matrix 12 as illustrated in FIG. 1.

<Evaluation 2: Measurement of Maximum Feret's Diameter of Domain>

A sample was cut out from the elastic layer of the electroconductive roller according to the present Example, using the microtome so that the sample includes a cross section in a thickness direction of the elastic layer. Samples from three portions (1/4)L, (2/4)L, and (3/4)L away from one end of the electroconductive roller, i.e., three samples, were cut out which were a total of one, where L is a length of the electroconductive roller in the direction orthogonal to the circumferential direction.

For each of the obtained three samples, the surface corresponding to the cross section of the elastic layer was photographed at a magnification of ×10000 under the scanning electron microscope (trade name: ULTRA plus, manufactured by Carl Zeiss), and an SEM image was obtained. The obtained SEM images were each converted into an 8-bit gray scale using image processing software (trade name: Image Pro Plus, produced by Media Cybernetics), and a monochrome image with 256 gradations was obtained. Subsequently, the black and white of the image is inverted so that the domain in the monochrome image becomes white, and a threshold value for binarization was set based on an algorithm of Otsu's discriminant analysis method for the luminance distribution of the image; and a binarized image was obtained. An observation region having a square shape 15 μm on a side was placed in each of arbitrary three portions of the obtained binarized image; subsequently 50 domains were arbitrarily selected from the domains existing in the observation region, and the maximum Feret's diameter was determined using a counting function of the above image processing software. An arithmetic average value of the nine maximum Feret's diameters from the three observation regions of the three samples was determined, and was described in Table 2 as an average domain size in the cross section.

<Evaluation 3: Evaluation by Small Angle X-Ray Scattering (SAXS)>

The scattering profile by the small angle X-ray scattering of a sample collected from the elastic layer was obtained in the following way. First, a small-angle X-ray scattering apparatus (product name: NANO-Viewer, manufactured by Rigaku Corporation) was provided, and the following observation conditions were set.

Wavelength/camera length: $\lambda=0.154$ nm(CuK$\alpha$)/0.580 m

Measurement region: 0.16 nm$^{-1}$<q<2.85 nm$^{-1}$ (2 nm<d<40 nm); Beam size/slit size/BS size: 0.9 mm$\phi$/0.5 mm$\phi$–0.3 mm$\phi$–0.7 mm$\phi$/4 mm$\phi$ A time period of exposure to the sample was set at 30 minutes×2, and a profile by scattering of the sample was obtained by subtracting the air scattering from the SAXS profile which was obtained by irradiating the sample with X-rays. A background was removed, and the peak was separated from the profile. Thus, peaks attributable to the rubber component were extracted, and a size and peak intensity of the crystal structure derived from the polyether skeleton were calculated. An evaluation method of a specific spectrum was as follows.

The blank was measured under the same conditions as in the measurement of the sample. This corresponds to the air scattering, and by subtracting the peak of the blank derived from the air scattering, the background at the time when the rubber sample was measured was removed to obtain a scattering profile of the rubber sample.

Subsequently, the waveform separation was performed in the region of wave numbers in which the peak of the scattering profile was observed, whereby a waveform separation profile was obtained. This time, three components (base line and two structural peaks) were set, the base line was fitted with a cubic function, and each of the two structural peaks was fitted with a Voigt function. "IGOR-PRO" (trade name: produced by Wave Metrics) was used, as graph processing software for the peak separation. Other software can also be used as long as the software has a function of digitizing the peak area by the waveform separation.

Subsequently, a method of calculating a peak intensity ratio will be described. A value (A2/A1) was defined as the peak intensity ratio, which was normalized by dividing an area (A2) of a peak (P3) attributable to the crystal structure derived from the polyether skeleton in the waveform separation profile, by a sum total (A1) of each of areas of peaks (P1 and P2) of the fatty acid and the fatty acid metal salt.

Figure 7:
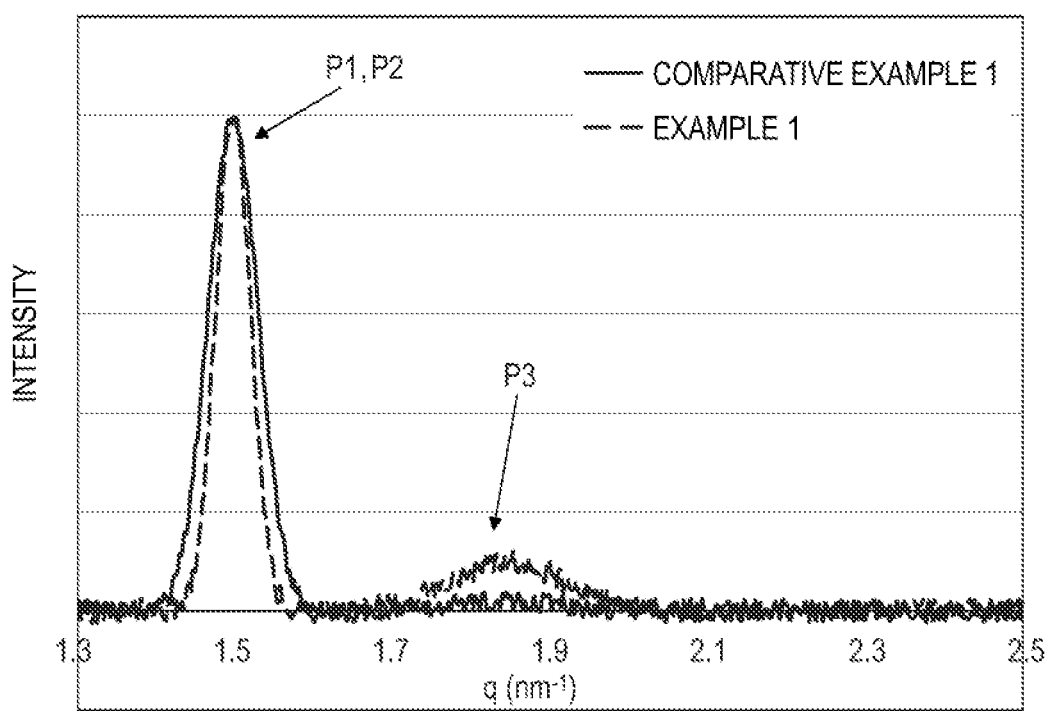
FIG. 7 is a spectrum diagram in Example 1 and Comparative Example 1 after SAXS profile base line processing.

FIG. 7 illustrates a spectrum diagram of scattering profiles after the base line processing, the scattering profiles being obtained by SAXS of samples collected from the elastic layers according to Example 1 and Comparative Example 1, which will be described later. As illustrated in the spectrum diagram, the peak P1 of stearic acid appears in a range from 1.40 nm$^{-1}$ to 1.60 nm$^{-1}$ in Example 1 (where peak P2 of fatty acid metal salt such as zinc stearate also appears in the same range). In addition, the peak P3 of the second rubber appears in a range from 1.85 nm$^{-1}$ to 1.95 nm$^{-1}$. On the other hand, in Comparative Example 1, the peak P3 is not almost observed, though the peak P1 is observed. The peak areas A1 and A2 were calculated from a waveform separation profile which was obtained by subjecting the waveform separation profile to smoothing processing by a simple movement average method of five points, using the above graph processing software.

<Evaluation 4: Evaluation of Uniform Dispersibility of Domain in Elastic Layer>

A dispersed state of the domains was obtained from a three-dimensional image of a sample collected from the elastic body layer, the three-dimensional image being reconstructed from a plurality of cross-sectional images of the sample acquired with FIB-SEM, for example. The FIB-SEM is a composite apparatus including an FIB (Focused Ion Beam) apparatus and an SEM (scanning electron microscope).

Specifically, the length in the direction orthogonal to the circumferential direction of the electroconductive roller according to the present Example was designated as L. Samples from positions at every 120° in the circumferential direction in three portions (1/4)L, (2/4)L, and (3/4)L away from one end, nine samples in total, were cut out from the elastic layer using the microtome. The sample has a cubic shape 9 μm on a side. Subsequently, for each sample, exposure of the cross section with the FIB, and photographing of the SEM image of the exposed cross section were repeated, and a group of slice images was obtained. The slice interval was 60 nm. From the obtained group of the slice images, a three-dimensional image was reconstructed using 3D visualization/analysis software. "Avizo" (trade name, manufactured by Thermo Fisher Scientific) was used as the 3D visualization/analysis software. Subsequently, in the obtained three-dimensional image, the cube 9 μm on a side was divided into 27 unit cubes each 3 μm on a side (see FIG. 2B), and the volume Vd of the domain included in each unit cube was calculated. Then, the arithmetic average value of Vd, Vd(avg), of each unit cube was obtained, and the number of unit cubes that has a Vd within a range of Vd(avg)±2.7 μm$^3$ was obtained. Then, the uniform dispersibility of the domains was evaluated according to the following criteria.

Rank I: the number is 25 or more.
Rank II: the number is 22 to 24.
Rank III: the number is 20 to 21.
Rank IV: the number is 15 or less.

In the present Example, a sample of a cubic shape 9 μm on a side collected from an elastic body layer was divided into 27 unit cubes 3 μm on a side, and an average value of volumes Vd of domains included in each unit cube, Vd(avg), was calculated, as described above. When the number of unit cubes having a Vd within a range of Vd(avg)±2.7 μm was 20 or more (Rank I to III) at that time, it was determined that the domains were uniformly dispersed in the sample. Further, when the number of samples of which the ranks were I to III was 8 or more among the nine samples, it was evaluated that the domain was uniformly dispersed in the elastic layer, which is marked by "Y" in Table 2. A case where this evaluation criterion was not satisfied is marked by "N".

<Evaluation 5: Measurement of Volume Resistivity of Elastic Layer>

A value of an electric current that flows through a partial area of the electrophotographic roller was measured using an apparatus for measuring electrical resistance, which would be described in detail below. In this apparatus, a columnar rotating electrode made of copper and having a diameter of 30 mm and a width of 20 mm was connected to an arbitrary position of the electrophotographic roller by applying a constant pressure; and the electrophotographic roller was rotated to thereby rotate the rotating electrode according to the rotational movement of the electrophotographic roller. Furthermore, a voltage between both ends of a reference resistor which was connected in series to the rotating electrode was measured, in a state in which a direct current voltage was applied to an electroconductive shaft core of the electrophotographic roller by an external power source. Thus, a value of an electric current that flowed through a region specified by the rotating electrode and a contact surface of the electrophotographic roller in the electroconductive elastic layer of the electrophotographic roller was obtained. The contact pressure was adjusted so that the area of the contact surface was within a range of 0.05 to 0.2 cm$^2$. A number of rotations of the electrophotographic roller was set at 30 rpm, a sampling frequency of the data was set at 20 Hz, and the electrical resistance value of the reference resistor was set at 1 kΩ. In addition, as for the applied voltage, a fixed voltage was set between 10 and 200 V so that the electric current value was 0.1 mA. Under the above conditions, measurements were performed in 12 regions per circumference on the outer surface of the electrophotographic roller for every 0.6 mm in the circumferential direction. Then, the rotating electrode was sequentially moved in the longitudinal direction of the electrophotographic roller, and the electric current values of 140 regions in total were measured in the same manner, while the electroconductive roller was rotated. Then, the average volume resistivity (Ω·cm) of 140 measurement regions was calculated from the found electric current value, the contact area between the electrophotographic roller and the rotating electrode, the thickness of the elastic layer at the measured portion, and the applied voltage. The electric current value was measured under the LL environment of a temperature of 15° C. and a relative humidity of 10%, and under an HH environment of a temperature of 30° C. and a relative humidity of 80%.

<Evaluation 6: Measurement of Volume Resistivity of Matrix and Domain>

The volume resistivity of the matrix was measured with a scanning probe microscope (SPM) (trade name: Q-Scope 250, manufactured by Quesant Instrument Corporation), in a contact mode in a manner described below. The measurement environment was determined to be the LL environment.

Firstly, a slice with a thickness of 2 μm was cut out from the elastic layer of the electrophotographic roller with a microtome (trade name: Leica EMFCS, manufactured by Leica Microsystems) at a cutting temperature of −100° C. in such a way that a cross section in the thickness direction of the elastic layer appeared. Subsequently, the slice was placed on a metal plate so that the surface of the slice corresponding to the cross section in the thickness direction of the elastic layer came in contact with the surface of the metal plate. Then, a cantilever of the SPM was contacted with a portion corresponding to the matrix, on the surface of the slice opposite to the surface in contact with the surface of the metal plate. Then, a voltage of 50 V was applied to the cantilever, and the electric current value was measured. In addition, the surface shape of the slice was observed with the SPM, and the thickness of the measured portion was calculated from the obtained height profile. Furthermore, an area of a concave part of the contact portion of the cantilever was calculated from the observation result of the surface shape. The volume resistivity was calculated from the found electric current value, the thickness, and the area of the concave part. As for the slices, one slice was collected from each of 20 regions in total, which were obtained by equally dividing the electrophotographic roller into five portions of in a direction orthogonal to the circumferential direction and equally dividing four portions in the circumferential direction. Then, an arithmetic average value of the volume resistivity calculated from each slice was obtained, which was used as the volume resistivity of the matrix of the elastic body to be the measurement target.

The volume resistivity of the domain was measured and calculated in the same manner as in the measurement method of the volume resistivity of the above matrix, except that the contact position of the cantilever was changed to the portion corresponding to the domain of the slice and the applied voltage was set at 1V.

<Evaluation 7: Measurement of Change in Electroconductivity of Electrophotographic Roller Under LL Environment>

Figure 6:
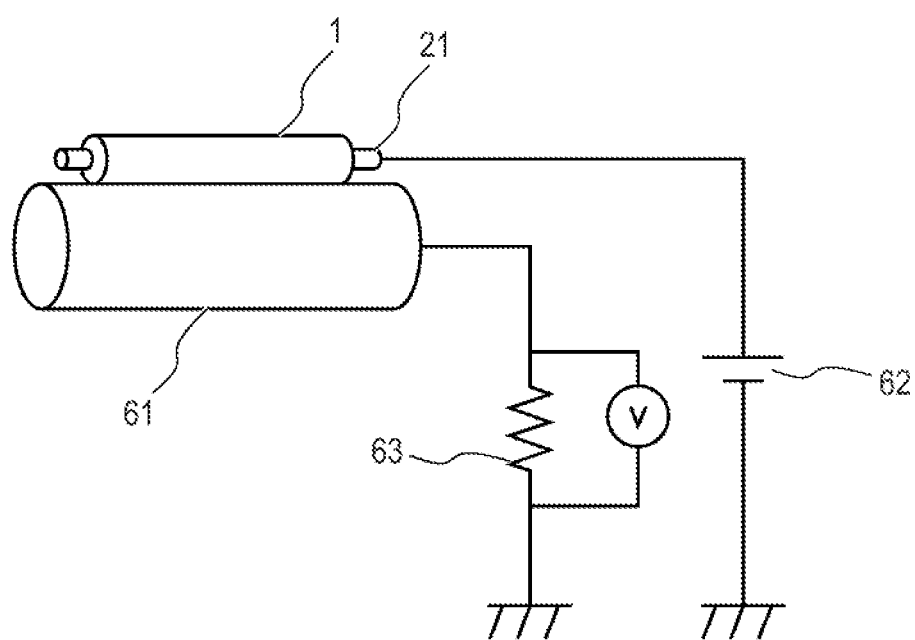
FIG. 6 illustrates an explanatory diagram of one aspect of an apparatus for measuring electrical resistance of the electroconductive elastic body.

A value of an electric current that flowed through the electrophotographic roller was measured using an apparatus for measuring electrical resistance of which the outline is illustrated in FIG. 6. In this apparatus, both end portions of the electroconductive substrate 11 of the electrophotographic roller were connected to a columnar metal drum 61 having a diameter of 30 mm by a pressing unit (not illustrated); and the metal drum 61 was rotationally driven to thereby rotate the electrophotographic roller 1. Furthermore, a direct current voltage was applied to the electroconductive substrate 11 of the electrophotographic roller 1 from an external power source 62. A voltage having a constant value which was set between 20 and 100 V of the direct current was applied between the electroconductive substrate 11 and the metal drum 61. In this state, the voltage between both ends of the reference resistor 63 which was connected to the metal drum 61 in series was measured. The value of the electric current that flowed through the electrophotographic roller 1 was calculated based on the electrical resistance value of the reference resistor 63 and the voltage between both ends of the reference resistor 63. The number of rotations of the metal drum 61 was set at 30 rpm, and the electrical resistance value of the reference resistor 63 was set at a predetermined value between 100Ω and 1 kΩ. In addition, a sampling frequency of the data was set at 20 Hz, and an average value of the measured values for 10 seconds was determined to be a value of the electric current that flowed through the electrophotographic roller 1. The value at this time was used as an initial electric current value $I_0$.

Subsequently, the above constant direct current voltage was continuously applied between the electroconductive substrate 11 and the metal drum 61 for 10 minutes, and then the electric current value was obtained in the same manner as in the above description. This electric current value was used as a durability electric current value $I_1$. In addition, the ratio of $I_1$ to $I_0$ was used as an electric current retention (%). Then, the electric current retention was evaluated according to the following criteria.

Rank A: retention is 90% or higher
Rank B: retention is 80% or higher and lower than 90%
Rank C: retention is 70% or higher and lower than 80%
Rank D: retention is 60% or higher and lower than 70%
Rank E: retention is 50% or higher and lower than 60%
Rank F: retention is lower than 50%

<Evaluation 8: Image Evaluation>

The image was evaluated in the following way using an electrophotographic image-forming apparatus equipped with the electrophotographic roller according to Example 1 as a charging roller.

Firstly, a laser printer (trade name: Laserjet M608dn, manufactured by HP Inc.) was provided as the electrophotographic image-forming apparatus. In order to evaluate the image formed by a high speed process, the above laser printer was modified so that the number of output sheets of the image of the A4 size per unit time was 75 sheets/minute. In addition, the output speed of the paper at this time was set at 370 mm/sec, and the image resolution was set at 1,200 dpi.

Subsequently, the electrophotographic roller according to Example 1, a main body of the electrophotographic image-forming apparatus and a process cartridge to be loaded in the main body were left in a low-temperature/low-humidity (LL) environment of a temperature of 15° C. and a relative humidity of 10% for 48 hours to be conditioned to the LL environment. Next, the electrophotographic roller was attached to the process cartridge as the charging roller. Then, under the same environment as above, a direct current voltage of −900 V was applied to the electrophotographic roller by an external power source (Trek 615 manufactured by Trek, Inc), and one sheet of a halftone image formed on A4 size paper was output. The halftone image is an image in which a line having a width of 1 dot is drawn at an interval of 2 dots in a direction orthogonal to a rotation direction of the electrophotographic photosensitive drum. This image is referred to as a "halftone image on first sheet". Subsequently, 2500 sheets of an electrophotographic image were output on A4 size paper, in which letters of the alphabet "E" having a size of 14 points were formed so that the print density became 1%. Subsequently, one sheet of the electrophotographic image was output, in which a halftone image was formed on A4 size paper. This image is referred to as a "halftone image on 2501st sheet". Then, the halftone image on the first sheet and the halftone image on the 2501st sheet were visually observed, and graininess of each image was evaluated according to the following criteria.

Rank A: graininess is not recognized.
Rank B: graininess is slightly recognized.
Rank C: graininess is recognized.
Rank D: graininess is remarkably recognized.

The results of Evaluation 1 to Evaluation 8 of the electrophotographic roller according to Example 1 are shown in Table 2. As for Evaluation 1, (1) the presence or absence of the peak P1 or P2 in the waveform separation profile, (2) the presence or absence of the peak P3, and (3) A2×C2/A1×C1, and (4) A2/A1 are shown.

Examples 2 to 8

(Production of A-Kneaded Rubber Composition)

A-kneaded rubber compositions according to Examples 2 to 8 were prepared in the same manner as the A-kneaded rubber composition according to Example 1, except that the formulation was changed as described in Table 1. Then, the extensional shearing force was imparted to the A-kneaded rubber composition according to each Example, in the same manner as in Example 1. A B-kneaded rubber composition was prepared in the same manner as in Example 1, except that thus obtained A-kneaded rubber composition was used to which the extensional shearing force was imparted. Subsequently, electrophotographic rollers according to Examples 2 to 8 were manufactured and evaluated in the same manner as in Example 1, except that the B-kneaded rubber composition according to each Example was used.

Evaluation results of Examples 1 to 8 are shown in Table 2.

TABLE 1

| Material | Material name | Example 1 | 2 | 3 | 4 | 5 | 6 | 7 | 8 |
|---|---|---|---|---|---|---|---|---|---|
| First ion conductive rubber | DN631 | 70 | 80 | — | — | — | 40 | — | — |
| | N230SV | — | — | — | — | — | — | 20 | 20 |
| | N1072 | — | — | 70 | 60 | 40 | — | — | — |
| | DN300 | — | — | — | — | — | — | — | — |
| Second ion conductive rubber | Z8010 | — | 20 | — | 40 | — | — | 80 | — |
| | CG102 | — | — | — | — | 60 | 60 | — | 80 |
| | ON301 | 30 | — | 30 | — | — | — | — | — |
| Vulcanization assistant | Stearic acid | 1 | 1 | 1 | 1 | 1 | 1 | 1 | 1 |
| Vulcanizing agent, | DMP | 1 | 1 | 1 | 1 | 1 | 1 | 1 | 1 |
| Vulcanization accelerator | TS | 1 | 1 | 1 | 1 | 1 | 1 | 1 | 1 |
| | Sulfur | 1.2 | 1.2 | 1.2 | 1.2 | 1.2 | 1.2 | 1.2 | 1.2 |
| Apparatus used for preparation of A-kneaded rubber composition (kneading conditions) | | Extensional shearing apparatus (number of rotations of screw: 1000 rpm) | | | | | | | |

In Table 1, details of each material are as follows.

DN631: NBR (trade name: Nipol DN631, produced by Zeon Corporation,)

N230SV: NBR (trade name: JSR N230SV, manufactured by JSR Corporation)

N1072: NBR (trade name: Nipol 1072, produced by Zeon Corporation)

DN300: NBR (trade name: Nipol DN300, produced by Zeon Corporation)

Z8010: polyether rubber (trade name: Zeospan 8010, produced by Zeon Corporation)

CG102: epichlorohydrin-ethylene oxide-allyl glycidyl ether terpolymer (trade name: Epichlomer CG102, produced by Osaka Soda Co., Ltd.)

ON301: epichlorohydrin-ethylene oxide-allyl glycidyl ether terpolymer (trade name: Epichlomer ON301, produced by Osaka Soda Co., Ltd.)

DMP: dibenzothiazolyl disulfide (trade name: Nocceler DMP, produced by Ouchi Shinko Chemical Industrial Co., Ltd.)

TS: tetramethylthiuram monosulfide (trade name: Nocceler TS, produced by Ouchi Shinko Chemical Industrial Co., Ltd.)

Sulfur: sulfur (trade name: PMC, produced by Tsurumi Chemical Industry Co., Ltd.)

TABLE 2

| | | Example | | | | | | | |
|---|---|---|---|---|---|---|---|---|---|
| | | 1 | 2 | 3 | 4 | 5 | 6 | 7 | 8 |
| Physical properties | P1 or P2 | Yes | Yes | Yes | Yes | Yes | Yes | Yes | Yes |
| | P3 | Yes | Yes | Yes | Yes | Yes | Yes | Yes | Yes |
| | A2·C2/A1·C1 | 0.017 | 0.017 | 0.017 | 0.017 | 0.017 | 0.017 | 0.017 | 0017 |
| | A2/A1 | 1.17 | 1.33 | 1.17 | 1.00 | 0.67 | 0.67 | 0.33 | 0.33 |
| | Evaluation of uniform dispersibility of domain | Y | Y | Y | Y | N | N | N | N |
| | Average size of domain in cross section (μm) | 0.63 | 0.51 | 0.62 | 0.64 | 1.58 | 1.63 | 2.34 | 2.41 |
| | Volume resistivity of elastic layer (Ω·cm) LL environment | 3.33E+07 | 3.33E+07 | 3.33E+07 | 4.67E+07 | 5.33E+07 | 5.33E+07 | 6.00E+07 | 6.00E+07 |
| | HH environment | 3.00E+06 | 3.50E+05 | 1.50E+06 | 4.00E+05 | 4.00E+06 | 8.00E+06 | 1.20E+06 | 9.00E+06 |
| | Resistance ratio, LL/HH | 11 | 95 | 22 | 117 | 13 | 7 | 50 | 7 |
| | Volume resistivity of matrix (Ω·cm) LL environment | 2.7E+09 | 2.7E+09 | 4.5E+09 | 4.5E+09 | 4.5E+09 | 2.7E+09 | 3.5E+09 | 3.5E+09 |
| | Volume resistivity of domain (Ω·cm) LL environment | 5.5E+07 | 7.5E+07 | 5.5E+07 | 7.5E+07 | 8.5E+07 | 8.5E+07 | 7.5E+07 | 8.5E+07 |
| | Evaluation rank of current retention | A | A | A | A | A | A | C | C |
| Evaluation rank of image | Halftone image of first sheet | A | A | A | A | A | A | A | A |
| | Halftone image on 2501st sheet | A | A | A | A | A | A | B | B |

Example 9

The extensional shearing force was imparted to an A-kneaded rubber composition in the same manner as in Example 1, except that the number of rotations of the screws was changed to 750 pm. A B-kneaded rubber composition was prepared in the same manner as in Example 1, except that thus obtained A-kneaded rubber composition was used to which the extensional shearing force was imparted. Subsequently, an electrophotographic roller according to Example 9 was manufactured and evaluated in the same manner as in Example 1, except that the obtained B-kneaded rubber composition was used.

Examples 10 to 16

(Production of Rubber Mixture)
An A-kneaded rubber composition was prepared in the same manner as the A-kneaded rubber composition according to Example 9, except that the formulation was changed as described in Table 3. Then, the extensional shearing force was imparted to the A-kneaded rubber composition according to each Example, in the same manner as in Example 9. A B-kneaded rubber composition was prepared in the same manner as in Example 9, except that thus obtained A-kneaded rubber composition was used to which the extensional shearing force was imparted. Subsequently, electrophotographic rollers according to Examples 10 to 16 were manufactured and evaluated in the same manner as in Example 9, except that the B-kneaded rubber composition according to each Example was used.

Evaluation results of Examples 9 to 16 are shown in Table 4.

TABLE 3

| | | Example | | | | | | | |
|---|---|---|---|---|---|---|---|---|---|
| Material | Material name | 9 | 10 | 11 | 12 | 13 | 14 | 15 | 16 |
| First ion conductive rubber | DN631 | 70 | 80 | — | — | — | 40 | — | — |
| | N230SV | — | — | — | — | — | — | 20 | 20 |
| | N1072 | — | — | 70 | 60 | 40 | — | — | — |
| Second ion conductive rubber | Z8010 | — | 20 | — | 40 | — | — | 80 | — |
| | CG102 | — | — | — | — | 60 | 60 | — | 80 |
| | ON301 | 30 | — | 30 | — | — | — | — | — |
| Vulcanization assistant | Stearic acid | 1 | 1 | 1 | 1 | 1 | 1 | 1 | 1 |
| Vulcanizing agent, | DMP | 1 | 1 | 1 | 1 | 1 | 1 | 1 | 1 |
| Vulcanization accelerator | TS | 1 | 1 | 1 | 1 | 1 | 1 | 1 | 1 |
| | Sulfur | 1.2 | 1.2 | 1.2 | 1.2 | 1.2 | 1.2 | 1.2 | 1.2 |
| Apparatus used for preparation of A-kneaded rubber composition (kneading conditions) | | Processing machine with extensional shear-applying apparatus (number of rotations of screw: 750 rpm) | | | | | | | |

In Table 3, details of the materials are the same as those in Table 1.

TABLE 4

| | | Example | | | | | | | |
|---|---|---|---|---|---|---|---|---|---|
| | | 9 | 10 | 11 | 12 | 13 | 14 | 15 | 16 |
| Physical properties | P1 or P2 | Yes | Yes | Yes | Yes | Yes | Yes | Yes | Yes |
| | P3 | Yes | Yes | Yes | Yes | Yes | Yes | Yes | Yes |
| | A2C2/A1C1 | 0.013 | 0.013 | 0.013 | 0.013 | 0.013 | 0.013 | 0.013 | 0.013 |
| | A2/A1 | 0.93 | 1.07 | 0.93 | 0.80 | 0.53 | 0.53 | 0.27 | 0.27 |
| | Evaluation of uniform dispersibility of domain | Y | Y | Y | Y | N | N | N | N |
| | Average size of domain in cross section (μm) | 0.65 | 0.57 | 0.68 | 0.71 | 1.7 | 1.75 | 2.44 | 2.5 |
| Volume resistivity of elastic layer (Ω·cm) | Resistance value in LL (Ωcm) | 5.00E+07 | 5.00E+07 | 5.00E+07 | 7.00E+07 | 8.00E+07 | 8.00E+07 | 9.00E+07 | 9.00E+07 |
| | Resistance value in HH (Ωcm) | 3.00E+06 | 3.50E+05 | 1.50E+06 | 4.00E+05 | 4.00E+06 | 8.00E+06 | 1.20E+06 | 9.00E+06 |
| | Resistance ratio, LL/HH | 17 | 143 | 33 | 175 | 20 | 10 | 75 | 10 |
| Volume resistivity of matrix (Ω·cm) | LL environment | 2.7E+09 | 2.7E+09 | 4.5E+09 | 4.5E+09 | 4.5E+09 | 2.7E+09 | 3.5E+09 | 3.5E+09 |
| Volume resistivity of domain (Ω·cm) | LL environment | 5.5E+07 | 7.5E+07 | 5.5E+07 | 7.5E+07 | 8.5E+07 | 8.5E+07 | 7.5E+07 | 8.5E+07 |
| | Evaluation rank of current retention | A | A | A | A | B | B | C | C |
| Evaluation rank of image | Halftone image of first sheet | A | A | A | A | A | A | A | A |
| | Halftone image on 2501st sheet | A | A | A | B | B | B | B | B |

Example 17

(Preparation of A-Kneaded Rubber Composition)

The processing machine which was used for the preparation of the A-kneaded rubber composition was changed to a pressure kneader (trade name: TD6-15MDX, manufactured by Toshin Co., Ltd.). The conditions for kneading by the pressure kneader were set to a filling rate of 70% and a number of rotations of blade of 30 rpm. In addition, an operation including continuously kneading for 2 minutes, then stopping the kneading, naturally cooling the rubber mixture, and then continuously kneading again for 2 minutes was repeated 5 times, in order to avoid a temperature of the rubber mixture from rising to 50° C. or higher due to heat generation by shearing. In this way, the A-kneaded rubber composition according to the present Example was prepared.

A B-kneaded rubber composition was prepared in the same manner as in Example 1, except that thus obtained A-kneaded rubber composition was used. Subsequently, an electrophotographic roller according to Example 17 was manufactured and evaluated in the same manner as in Example 1, except that the B-kneaded rubber composition according to the present Example was used.

Examples 18 to 24

(Production of Rubber Mixture)

A-kneaded rubber compositions according to Examples 18 to 24 were prepared in the same manner as the A-kneaded rubber composition according to Example 17, except that the formulation was changed as described in Table 5. A B-kneaded rubber composition was prepared in the same manner as in Example 1, except that thus obtained A-kneaded rubber composition was used to which the extensional shearing force was imparted. Subsequently, electrophotographic rollers according to Examples 18 to 24 were manufactured and evaluated in the same manner as in Example 1, except that the B-kneaded rubber composition according to each Example was used.

Evaluation results of Examples 17 to 24 are shown in Table 6.

TABLE 5

| | | Example | | | | | | | |
|---|---|---|---|---|---|---|---|---|---|
| Material | Material name | 17 | 18 | 19 | 20 | 21 | 22 | 23 | 24 |
| First ion conductive rubber | DN631 | 70 | 80 | — | — | — | — | — | 40 |
| | N230SV | — | — | — | — | — | 20 | 20 | — |
| | N1072 | — | — | 70 | 60 | 40 | — | — | — |
| Second ion conductive rubber | Z8010 | — | 20 | — | 40 | — | 80 | — | — |
| | CG102 | — | — | — | — | 60 | — | 80 | 60 |
| | ON301 | 30 | — | 30 | — | — | — | — | — |
| Vulcanization assistant | Stearic acid | 1 | 1 | 1 | 1 | 1 | 1 | 1 | 1 |
| Vulcanizing agent, | DMP | 1 | 1 | 1 | 1 | 1 | 1 | 1 | 1 |
| Vulcanization accelerator | TS | 1 | 1 | 1 | 1 | 1 | 1 | 1 | 1 |
| | Sulfur | 1.2 | 1.2 | 1.2 | 1.2 | 1.2 | 1.2 | 1.2 | 1.2 |
| Apparatus used for preparation of A-kneaded rubber composition (kneading conditions) | | Pressure kneader (number of rotations of blade: 30 rpm, continuous kneading time: 2 minutes × 5) | | | | | | | |

In Table 5, details of the materials are the same as those in Table 1.

TABLE 6

|  |  | Example | | | | | | | |
|---|---|---|---|---|---|---|---|---|---|
|  |  | 17 | 18 | 19 | 20 | 21 | 22 | 23 | 24 |
| Physical properties | P1 or P2 | Yes | Yes | Yes | Yes | Yes | Yes | Yes | Yes |
|  | P3 | Yes | Yes | Yes | Yes | Yes | Yes | Yes | Yes |
|  | A2C2/A1C1 | 0.007 | 0.007 | 0.007 | 0.007 | 0.007 | 0.007 | 0.007 | 0.007 |
|  | A2/A1 | 0.47 | 0.53 | 0.47 | 0.40 | 0.27 | 0.13 | 0.13 | 0.27 |
|  | Evaluation of uniform dispersibility of domain | N | Y | N | N | N | N | N | N |
|  | Average size of domain in cross section (μm) | 0.70 | 0.65 | 0.79 | 0.76 | 1.75 | 1.86 | 2.55 | 2.65 |
| Volume resistivity of elastic layer (Ω · cm) | Resistance value in LL (Ωcm) | 1.50E+08 | 1.50E+08 | 1.50E+08 | 2.10E+08 | 2.40E+08 | 2.70E+08 | 2.70E+08 | 2.40E+08 |
|  | Resistance value in HH (Ωcm) | 4.50E+06 | 5.25E+05 | 2.25E+06 | 6.00E+05 | 1.20E+07 | 1.80E+06 | 1.35E+07 | 1.20E+07 |
|  | Resistance ratio, LL/HH | 33 | 286 | 67 | 350 | 40 | 150 | 20 | 20 |
| Volume resistivity of matrix (Ω · cm) | LL environment | 2.7E+09 | 2.7E+09 | 4.5E+09 | 4.5E+09 | 4.5E+09 | 2.7E+09 | 3.5E+09 | 3.5E+09 |
| Volume resistivity of domain (Ω · cm) | LL environment | 5.5E+07 | 7.5E+07 | 5.5E+07 | 7.5E+07 | 8.5E+07 | 8.5E+07 | 7.5E+07 | 8.5E+07 |
| Evaluation rank of image | Evaluation rank of current retention | B | B | B | B | C | C | C | C |
|  | Halftone image of first sheet | B | B | B | B | B | B | B | B |
|  | Halftone image on 2501st sheet | C | C | C | C | C | C | C | C |

Examples 25 to 33

The formulation was changed as described in Table 7, and the number of rotations of the screw as an apparatus for imparting extensional shearing force was changed as described in Table 7. An A-kneaded rubber composition to which an extensional shearing force was applied was prepared in the same manner as the A-kneaded rubber composition according to Example 1, except for the above changes. A B-kneaded rubber composition was prepared in the same manner as in Example 1, except that thus obtained A-kneaded rubber composition was used to which the extensional shearing force was imparted. Subsequently, electrophotographic rollers according to Examples 25 to 33 were manufactured in the same manner as in Example 1, except that the B-kneaded rubber composition according to each Example was used; and were subjected to Evaluation 1 to Evaluation 7. The evaluation results are shown in Table 8.

TABLE 7

|  |  | Example | | | | | | | | |
|---|---|---|---|---|---|---|---|---|---|---|
| Material | Material name | 25 | 26 | 27 | 28 | 29 | 30 | 31 | 32 | 33 |
| First ion conductive rubber | DN631 | 70 | 70 | 70 | 60 | 60 | 60 | 50 | 50 | 50 |
| Second ion conductive rubber | CG102 | 30 | 30 | 30 | 40 | 40 | 40 | 50 | 50 | 50 |
| Vulcanization assistant | Stearic acid | 1 | 1 | 1 | 1 | 1 | 1 | 1 | 1 | 1 |
| Vulcanizing agent, | DMP | 1 | 1 | 1 | 1 | 1 | 1 | 1 | 1 | 1 |
| Vulcanization accelerator | TS | 1 | 1 | 1 | 1 | 1 | 1 | 1 | 1 | 1 |
|  | Sulfur | 1.2 | 1.2 | 1.2 | 1.2 | 1.2 | 1.2 | 1.2 | 1.2 | 1.2 |
| Number of rotations of screw (rpm) |  | 1000 | 750 | 500 | 1000 | 750 | 500 | 1000 | 750 | 500 |

In Table 7, details of the materials are the same as those in Table 1.

TABLE 8

|  |  | Example | | | | | | | | |
|---|---|---|---|---|---|---|---|---|---|---|
|  |  | 25 | 26 | 27 | 28 | 29 | 30 | 31 | 32 | 33 |
| Physical properties | P1 or P2 | Yes | Yes | Yes | Yes | Yes | Yes | Yes | Yes | Yes |
|  | P3 | Yes | Yes | Yes | Yes | Yes | Yes | Yes | Yes | Yes |
|  | A2C2/A1C1 | 0.017 | 0.013 | 0.010 | 0.017 | 0.013 | 0.010 | 0.017 | 0.013 | 0.010 |
|  | A2/A1 | 1.17 | 0.93 | 0.70 | 1.00 | 0.80 | 0.60 | 0.83 | 0.67 | 0.50 |
|  | Evaluation of uniform dispersibility of domain | Y | Y | Y | Y | Y | Y | N | N | N |

TABLE 8-continued

| | | Example | | | | | | | | |
|---|---|---|---|---|---|---|---|---|---|---|
| | | 25 | 26 | 27 | 28 | 29 | 30 | 31 | 32 | 33 |
| Average size of domain in cross section (μm) | | 0.63 | 0.7 | 0.77 | 0.7 | 0.77 | 0.83 | 1.2 | 1.28 | 1.32 |
| Volume resistivity of elastic layer (Ω·cm) | Resistance value in LL (Ωcm) | 2.77E+08 | 4.16E+08 | 6.24E+08 | 2.13E+08 | 3.20E+08 | 4.80E+08 | 1.07E+08 | 1.60E+08 | 2.40E+08 |
| | Resistance value in HH (Ωcm) | 3.95E+07 | 4.16E+07 | 4.37E+07 | 3.04E+07 | 3.20E+07 | 3.36E+07 | 1.52E+07 | 1.60E+07 | 1.68E+07 |
| | Resistance ratio, LL/HH | 7 | 10 | 14 | 7 | 10 | 14 | 7 | 10 | 14 |
| Volume resistivity of matrix (Ω·cm) | LL environment | 2.7E+09 | 2.7E+09 | 2.7E+09 | 2.7E+09 | 2.7E+09 | 2.7E+09 | 2.7E+09 | 2.7E+09 | 2.7E+09 |
| Volume resistivity of domain (Ω·cm) | LL environment | 8.5E+07 | 8.5E+07 | 8.5E+07 | 8.5E+07 | 8.5E+07 | 8.5E+07 | 8.5E+07 | 8.5E+07 | 8.5E+07 |
| Evaluation rank of current retention | | A | A | A | A | A | A | A | B | B |

Examples 34 to 42

The formulation was changed as described in Table 9, and the number of rotations of the screw which was the apparatus for imparting extensional shearing force was changed as described in Table 9. An A-kneaded rubber composition to which the extensional shearing force was applied was prepared in the same manner as the A-kneaded rubber composition according to Example 1, except for the above changes. A B-kneaded rubber composition was prepared in the same manner as in Example 1, except that thus obtained A-kneaded rubber composition was used to which the extensional shearing force was imparted. Subsequently, electrophotographic rollers according to Examples 34 to 42 were manufactured in the same manner as in Example 1, except that the B-kneaded rubber composition according to each Example was used; and were subjected to Evaluation 1 to Evaluation 7. Evaluation results of Examples 34 to 42 are shown in Table 10.

TABLE 9

| Material | Material name | Example | | | | | | | | |
|---|---|---|---|---|---|---|---|---|---|---|
| | | 34 | 35 | 36 | 37 | 38 | 39 | 40 | 41 | 42 |
| First ion conductive rubber | DN631 | 30 | 30 | 30 | 20 | 20 | 20 | 80 | 80 | 80 |
| Second ion conductive rubber | CG102 | 70 | 70 | 70 | 80 | 80 | 80 | 20 | 20 | 20 |
| Vulcanization assistant | Stearic acid | 1 | 1 | 1 | 1 | 1 | 1 | 1 | 1 | 1 |
| Vulcanizing agent, | DMP | 1 | 1 | 1 | 1 | 1 | 1 | 1 | 1 | 1 |
| Vulcanization accelerator | TS | 1 | 1 | 1 | 1 | 1 | 1 | 1 | 1 | 1 |
| | Sulfur | 1.2 | 1.2 | 1.2 | 1.2 | 1.2 | 1.2 | 1.2 | 1.2 | 1.2 |
| Number of rotations of screw (rpm) | | 1000 | 750 | 500 | 1000 | 750 | 500 | 1000 | 750 | 500 |

In Table 9, details of the materials are the same as those in Table 1.

TABLE 10

| | | Example | | | | | | | | |
|---|---|---|---|---|---|---|---|---|---|---|
| | | 34 | 35 | 36 | 37 | 38 | 39 | 40 | 41 | 42 |
| Physical properties | P1 or P2 | Yes | Yes | Yes | Yes | Yes | Yes | Yes | Yes | Yes |
| | P3 | Yes | Yes | Yes | Yes | Yes | Yes | Yes | Yes | Yes |
| | A2C2/A1C1 | 0.017 | 0.013 | 0.010 | 0.017 | 0.013 | 0.010 | 0.017 | 0.013 | 0.010 |
| | A2/A1 | 0.50 | 0.40 | 0.30 | 1.33 | 1.07 | 0.80 | 0.33 | 0.27 | 0.21 |
| | Evaluation of uniform dispersibility of domain | N | N | N | N | N | N | Y | Y | Y |
| | Average size of domain in cross section (μm) | 2.01 | 2.08 | 2.14 | 0.53 | 0.56 | 0.64 | 2.34 | 2.45 | 2.52 |

TABLE 10-continued

| | | Example | | | | | | | | |
|---|---|---|---|---|---|---|---|---|---|---|
| | | 34 | 35 | 36 | 37 | 38 | 39 | 40 | 41 | 42 |
| Volume resistivity of elastic layer (Ω·cm) | Resistance value in LL (Ωcm) | 3.60E+08 | 5.41E+08 | 8.11E+08 | 2.67E+07 | 4.00E+07 | 6.00E+07 | 8.05E+08 | 9.01E+08 | 1.05E+09 |
| | Resistance value in HH (Ωcm) | 5.14E+07 | 5.41E+07 | 5.68E+07 | 3.80E+06 | 4.00E+06 | 4.20E+06 | 8.56E+07 | 9.01E+07 | 9.46E+07 |
| | Resistance ratio, LL/HH | 7 | 10 | 14 | 7 | 10 | 14 | 7 | 10 | 14 |
| Volume resistivity of matrix (Ω·cm) | LL environment | 2.7E+09 | 2.7E+09 | 2.7E+09 | 2.7E+09 | 2.7E+09 | 2.7E+09 | 2.7E+09 | 2.7E+09 | 2.7E+09 |
| Volume resistivity of domain (Ω·cm) | LL environment | 8.5E+07 | 8.5E+07 | 8.5E+07 | 8.5E+07 | 8.5E+07 | 8.5E+07 | 8.5E+07 | 8.5E+07 | 8.5E+07 |
| Evaluation rank of current retention | | B | B | B | A | A | A | C | C | C |

Examples 43 to 50

The formulation was changed as described in Table 11, and the number of rotations of the screw which was the apparatus for imparting extensional shearing force was changed as described in Table 11. An A-kneaded rubber composition to which the extensional shearing force was applied was prepared in the same manner as the A-kneaded rubber composition according to Example 1, except for the above changes. A B-kneaded rubber composition was prepared in the same manner as in Example 1, except that thus obtained A-kneaded rubber composition was used to which the extensional shearing force was imparted. Subsequently, electrophotographic rollers according to Examples 43 to 50 were manufactured in the same manner as in Example 1, except that the B-kneaded rubber composition according to each Example was used; and were subjected to Evaluation 1 to Evaluation 7. The evaluation results are shown in Table 12.

TABLE 11

| | Material name | Example | | | | | | | |
|---|---|---|---|---|---|---|---|---|---|
| Material | | 43 | 44 | 45 | 46 | 47 | 48 | 49 | 50 |
| First ion conductive rubber | DN631 | 90 | 90 | 90 | 10 | 10 | 10 | — | — |
| | B31 | — | — | — | — | — | — | 70 | 70 |
| Second ion conductive rubber | Z8010 | — | — | — | — | — | — | 30 | — |
| | CG102 | 10 | 10 | 10 | 90 | 90 | 90 | — | 30 |
| Vulcanization assistant | Stearic acid | 1 | 1 | 1 | 1 | 1 | 1 | 1 | 1 |
| Vulcanizing agent, | DMP | 1 | 1 | 1 | 1 | 1 | 1 | 1 | 1 |
| Vulcanization accelerator | TS | 1 | 1 | 1 | 1 | 1 | 1 | 1 | 1 |
| | Sulfur | 1.2 | 1.2 | 1.2 | 1.2 | 1.2 | 1.2 | 1.2 | 1.2 |
| Number of rotations of screw (rpm) | | 1000 | 750 | 500 | 1000 | 750 | 500 | 1000 | 1000 |

In Table 11, details of materials other than B31 are the same as those in Table 1.

B31: chloroprene rubber (trade name: Skyprene B31, produced by Tosoh Corporation)

TABLE 12

| | | Example | | | | | | | |
|---|---|---|---|---|---|---|---|---|---|
| | | 43 | 44 | 45 | 46 | 47 | 48 | 49 | 50 |
| Physical properties | P1 or P2 | Yes | Yes | Yes | Yes | Yes | Yes | Yes | Yes |
| | P3 | Yes | Yes | Yes | Yes | Yes | Yes | Yes | Yes |
| | A2C2/A1C1 | 0.017 | 0.013 | 0.010 | 0.017 | 0.013 | 0.010 | 0.017 | 0.013 |
| | A2/A1 | 1.50 | 1.20 | 0.90 | 0.17 | 0.13 | 0.10 | 1.17 | 0.93 |
| | Evaluation of uniform dispersibility of domain | Y | Y | Y | N | N | N | Y | Y |
| | Average size of domain in cross section (μm) | 0.41 | 0.43 | 0.45 | 3.13 | 3.16 | 3.17 | 0.77 | 0.77 |

TABLE 12-continued

| | | Example | | | | | | | |
|---|---|---|---|---|---|---|---|---|---|
| | | 43 | 44 | 45 | 46 | 47 | 48 | 49 | 50 |
| Volume resistivity of elastic layer ($\Omega \cdot cm$) | Resistance value in LL ($\Omega cm$) | 8.05E+08 | 9.01E+08 | 1.05E+09 | 2.40E+07 | 3.60E+07 | 5.40E+07 | 3.54E+09 | 5.63E+09 |
| | Resistance value in HH ($\Omega cm$) | 8.56E+07 | 9.01E+07 | 9.46E+07 | 3.42E+06 | 3.60E+06 | 3.78E+076 | 2.84E+08 | 4.02E+08 |
| | Resistance ratio, LL/HH | 9 | 10 | 11 | 7 | 10 | 14 | 13 | 14 |
| Volume resistivity of matrix ($\Omega \cdot cm$) | LL environment | 2.7E+09 | 2.7E+09 | 2.7E+09 | 2.7E+09 | 2.7E+09 | 2.7E+09 | 8.7E+10 | 8.7E+10 |
| Volume resistivity of domain ($\Omega \cdot cm$) | LL environment | 8.5E+07 | 8.5E+07 | 8.5E+07 | 8.5E+07 | 8.5E+07 | 8.5E+07 | 8.5E+07 | 8.5E+07 |
| Evaluation rank of current retention | | B | B | B | A | A | A | C | B |

Comparative Examples 1 to 8

As shown in Table 13, electrophotographic rollers according to Comparative Examples 1 to 8 were manufactured in the same manner as in Examples 17 to 24, except that the mixing time period by the pressure kneader in preparation of the A-kneaded rubber composition in Examples 17 to 24 was changed to 16 minutes; and were subjected to Evaluation 1 to Evaluation 8.

TABLE 13

| | Comparative Example | | | | | | | |
|---|---|---|---|---|---|---|---|---|
| | 1 | 2 | 3 | 4 | 5 | 6 | 7 | 8 |
| Apparatus used for preparation of A-kneaded rubber composition (kneading conditions) | Pressure kneader (number of rotations of blade: 30 rpm, continuous kneading time: 16 minutes) | | | | | | | |

Comparative Example 9

The materials shown in Table 14 were mixed using an open roll, and an unvulcanized rubber mixture was prepared. An electroconductive roller was manufactured in the same manner as in Example 1, except that thus obtained unvulcanized rubber mixture was used in place of the B-kneaded rubber composition; and was subjected to Evaluation 1 to Evaluation 8.

Evaluation results of Comparative Examples 1 to 9 are shown in Table 15.

TABLE 14

| Material | Material name | Comparative Example 9 |
|---|---|---|
| First ion conductive rubber | DN300 | 50 |
| Second ion conductive rubber | G1000 | 20 |
| | Z8030 | 30 |
| Liquid rubber | LNR1312 | 30 |
| Vulcanization assistant | Zinc oxide | 3 |
| | Stearic acid | 2 |
| Filler | Calcium carbonate | 40 |
| | Hydrotalcite | 3 |

TABLE 14-continued

| Material | Material name | Comparative Example 9 |
|---|---|---|
| Foaming agent | ADCA | 4 |
| Vulcanizing agent, | Sulfur | 0.5 |
| Vulcanization accelerator | M | 2.0 |
| | TRA | 1.5 |
| | MQDTC | 1.0 |
| Apparatus used for preparation of rubber mixture | | Open roll |

In Table 14, the details of the materials are the same as those in Table 1, except for the following materials.

G1000: epichlorohydrin rubber (trade name: Gechron1000, produced by Zeon Corporation)

Z8030: ternary copolymer of polyethylene oxide-polypropylene oxide-allyl glycidyl ether (trade name: Zeospan 8030, produced by Zeon Corporation)

LNR1312: liquid nitrile rubber (trade name: Nipol 1312, produced by Zeon Corporation)

ADCA: azodicarboimide

M: mercaptobenzothiazole

TRA: dipentamethylene thiuram tetrasulfide

MQDTC: 6-methylquinoxaline-2,3-dithiocarbonate

TABLE 15

|  |  | Comparative Example | | | | | | | | |
|---|---|---|---|---|---|---|---|---|---|---|
|  |  | 1 | 2 | 3 | 4 | 5 | 6 | 7 | 8 | 9 |
| Physical properties | P1 or P2 | Yes | Yes | Yes | Yes | Yes | Yes | Yes | Yes | Yes |
|  | P3 | Yes | Yes | Yes | Yes | Yes | Yes | Yes | Yes | Yes |
|  | A2C2/A1C1 | 0.003 | 0.003 | 0.003 | 0.003 | 0.003 | 0.003 | 0.003 | 0.003 | 0.003 |
|  | A2/A1 | 0.23 | 0.23 | 0.23 | 0.20 | 0.13 | 0.07 | 0.07 | 0.13 | 0.15 |
|  | Evaluation of uniform dispersibility of domain | Y | Y | N | N | N | N | N | N | Y |
|  | Average size of domain in cross section (μm) | 0.79 | 0.75 | 0.76 | 0.81 | 1.8 | 1.86 | 2.72 | 2.76 | 0.91 |
| Volume resistivity of elastic layer (Ω·cm) | Resistance value in LL (Ωcm) | 3.00E+08 | 3.00E+08 | 3.00E+08 | 4.20E+08 | 4.80E+08 | 4.80E+08 | 5.40E+08 | 5.40E+08 | 3.00E+08 |
|  | Resistance value in HH (Ωcm) | 4.50E+06 | 5.25E+05 | 2.25E+06 | 6.00E+05 | 6.00E+06 | 1.20E+07 | 1.80E+06 | 1.35E+07 | 7.50E+05 |
|  | Resistance ratio, LL/HH | 67 | 571 | 133 | 700 | 80 | 40 | 300 | 40 | 447 |
| Volume resistivity of matrix (Ω·cm) | LL environment | 2.7E+09 | 2.7E+09 | 4.5E+09 | 4.5E+09 | 4.5E+09 | 2.7E+09 | 3.5E+09 | 3.5E+09 | 3.1+09 |
| Volume resistivity of domain (Ω·cm) | LL environment | 5.5E+07 | 7.5E+07 | 5.5E+07 | 7.5E+07 | 8.5E+07 | 8.5E+07 | 7.5E+07 | 8.5E+07 | 8.0+07 |
| Evaluation rank of image | Evaluation rank of current retention | E | E | E | E | E | E | F | F | D |
|  | Halftone image of first sheet | C | C | C | C | C | C | C | C | C |
|  | Halftone image on 2501st sheet | D | D | D | D | D | D | D | D | D |

According to the present disclosure, the carrier was successfully moved more efficiently without dependence on the environment even under a high-speed process as described above. As a result, an electroconductive member including an elastic body was provided of which the electrical resistance value was unlikely to change due to energization deterioration even under the high-speed process, and which enabled stable and continuous formation of a high-quality electrophotographic image free from fine horizontal streak defects; and a method for manufacturing the same was also provided. In addition, according to one aspect of the present disclosure, an electroconductive member for electrophotography formed of the elastic body was obtained which enabled stable formation of the high-quality electrophotographic image even under the high-speed process.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-094677, filed May 29, 2020, and Japanese Patent Application No. 2021-083966, filed May 18, 2021, which are hereby incorporated by reference herein in their entirety.

What is claimed is:

1. An electroconductive elastic body comprising:

a cross-linked product of a first ionic electro-conductive rubber, a cross-linked product of a second ionic electro-conductive rubber that is different from the first ionic electro-conductive rubber, and either one or both of a fatty acid and a fatty acid metal salt, the electroconductive elastic body having a matrix that includes the cross-linked product of the first ionic electro-conductive rubber, and a domain that includes the cross-linked product of the second ionic electro-conductive rubber;

the cross-linked product of the second ionic electro-conductive rubber including a polyether skeleton;

an electrical resistance of the domain being lower than an electrical resistance of the matrix, wherein in a waveform separation profile of the elastic body as obtained by waveform separation of a scattering profile measured at a temperature of 24° C. by a small-angle X-ray scattering method, a peak top of each of P1 and P2 exists in a range of 1.40 $nm^{-1}$ to 1.60 $nm^{-1}$, and a peak top of P3 exists in a range of 1.85 $nm^{-1}$ to 1.95 $nm^{-1}$, wherein P1 represents a peak attributable to the fatty acid, P2 represents a peak attributable to the fatty acid metal salt, and P3 represents a peak attributable to the cross-linked product of the second ionic electro-conductive rubber; and wherein A2 and A1 satisfy a relationship expressed by the following expression (1):

$$0.005 \leq (A2 \times C2/A1 \times C1) \leq 0.030 \quad (1)$$

wherein A1 represents a total sum of peak areas of P1 and P2, A2 represents a peak area of P3, C1 represents a content (% by mass) of the cross-linked product of the second ionic electro-conductive rubber in the elastic body, and C2 represents a content (% by mass) of the fatty acid and the fatty acid metal salt.

2. The electroconductive elastic body according to claim 1, wherein when samples of a first cubic shape having 9 μm on a side are sampled from arbitrary 9 portions of the elastic body, at least eight of the samples satisfy the following Condition (1):

Condition (1)

Assuming that each of the samples is divided into 27 unit cubes having 3 μm on a side, and a volume Vd of the domains contained in each of the unit cubes is calculated, among 27 of the unit cubes in the respective samples, at least 20 of the unit cubes have Vds each of which falls within a range of ±2.7 μm$^3$ with respect to an average value of Vds of all the 27 unit cubes.

3. The electroconductive elastic body according to claim 1, wherein the second ionic electro-conductive rubber is one or more polymers selected from the group consisting of an epichlorohydrin-ethylene oxide-allyl glycidyl ether terpolymer and polyether-based synthetic rubber.

4. The electroconductive elastic body according to claim 1, wherein the first ionic electro-conductive rubber is at least one or more rubbers selected from the group consisting of acrylonitrile-butadiene rubber, epichlorohydrin rubber, ethylene-propylene rubber, chloroprene rubber, and modified rubbers and hydrogenated products thereof.

5. The electroconductive elastic body according to claim 1, wherein the fatty acid and the fatty acid metal salt are at least one selected from the group consisting of stearic acid, zinc stearate, and calcium stearate.

6. The electroconductive elastic body according to claim 1, wherein a volume resistivity of the electroconductive elastic body at a temperature of 15° C. and a relative humidity of 10% is $1.0 \times 10^5$ Ω·cm to $1.0 \times 10^{10}$ Ω·cm.

7. The electroconductive elastic body according to claim 1, wherein a volume resistivity of the matrix at a temperature of 15° C. and a relative humidity of 10% is $1.0 \times 10^7$ or larger and $1.0 \times 10^{13}$ Ω·cm or smaller.

8. The electroconductive elastic body according to claim 1, wherein a volume resistivity of the domain at a temperature of 15° C. and a relative humidity of 10% is $1.0 \times 10^5$ Ωcm or larger and $1.0 \times 10^8$ Ωcm or smaller.

9. The electroconductive elastic body according to claim 1, wherein a volume resistivity of the matrix is 5 or more times as large as a volume resistivity of the domain.

10. A method for producing an electroconductive elastic body, the electroconductive body comprising:
a cross-linked product of a first ionic electro-conductive rubber,
a cross-linked product of a second ionic electro-conductive rubber that is different from the first ionic electro-conductive rubber, and
either one or both of a fatty acid and a fatty acid metal salt,
the electroconductive elastic body having
a matrix that includes the cross-linked product of the first ionic electro-conductive rubber, and
a domain that includes the cross-linked product of the second ionic electro-conductive rubber, wherein
the cross-linked product of the second ionic electro-conductive rubber including a polyether skeleton;
an electrical resistance of the domain being lower than an electrical resistance of the matrix,
in a waveform separation profile of the elastic body as obtained by waveform separation of a scattering profile measured at a temperature of 24° C. by a small-angle X-ray scattering method,
a peak top of each of P1 and P2 existing in a range of 1.40 nm$^{-1}$ to 1.60 nm$^{-1}$, and
a peak top of P3 existing in a range of 1.85 nm$^{-1}$ to 1.95 nm$^{-1}$,
wherein P1 represents a peak attributable to the fatty acid, P2 represents a peak attributable to the fatty acid metal salt, and P3 represents a peak attributable to the cross-linked product of the second ionic electro-conductive rubber; and
A2 and A1 satisfying a relationship expressed by the following expression (1):

$$0.005 \leq (A2 \times C2 / A1 \times C1) \leq 0.030 \quad (1)$$

wherein A1 represents a total sum of peak areas of P1 and P2, A2 represents a peak area of P3, C1 represents a content (% by mass) of the cross-linked product of the second ionic electro-conductive rubber in the elastic body, and C2 represents a content (% by mass) of the fatty acid and the fatty acid metal salt;

the method comprising the steps of:
(1) kneading a rubber mixture comprising the first ionic electro-conductive rubber, the second ionic electro-conductive rubber, and either one or both of the fatty acid and the fatty acid metal salt while applying extensional shear thereto, to thereby obtain an unvulcanized rubber mixture; and
(2) curing the unvulcanized rubber mixture.

11. An electrophotographic member comprising:
an electroconductive substrate, and an electroconductive elastic layer on the substrate, wherein
the elastic layer comprises an electroconductive elastic body, wherein
the electroconductive elastic body comprises:
a cross-linked product of a first ionic electro-conductive rubber,
a cross-linked product of a second ionic electro-conductive rubber that is different from the first ionic electro-conductive rubber, and
either one or both of a fatty acid and a fatty acid metal salt;
the electroconductive elastic body has
a matrix that includes the cross-linked product of the first ionic electro-conductive rubber, and
a domain that includes the cross-linked product of the second ionic electro-conductive rubber;
the cross-linked product of the second ionic electro-conductive rubber includes a polyether skeleton;
an electrical resistance of the domain is lower than an electrical resistance of the matrix;
in a waveform separation profile of the elastic body as obtained by waveform separation of a scattering profile measured at a temperature of 24° C. by a small-angle X-ray scattering method,
a peak top of each of P1 and P2 exists in a range of 1.40 nm$^{-1}$ to 1.60 nm$^{-1}$, and
a peak top of P3 exists in a range of 1.85 nm$^{-1}$ to 1.95 nm$^{-1}$,
wherein P1 represents a peak attributable to the fatty acid, P2 represents a peak attributable to the fatty acid metal salt, and P3 represents a peak attributable to the cross-linked product of the second ionic electro-conductive rubber; and
A2 and A1 satisfy a relationship expressed by the following expression (1):

$$0.005 \leq (A2 \times C2 / A1 \times C1) \leq 0.030 \quad (1)$$

wherein A1 represents a sum total of peak areas of P1 and P2, A2 represents a peak area of P3, C1 represents a content (% by mass) of the cross-linked product of the second ionic electro-conductive rubber in the elastic body, and C2 represents a content (% by mass) of the fatty acid and the fatty acid metal salt.

12. A process cartridge configured to be detachable from a main body of an electrophotographic image-forming apparatus, the process cartridge including an electrophotographic member, wherein the electrophotographic member comprises an electroconductive substrate and an electroconductive elastic layer on the substrate, wherein the elastic layer comprises an electroconductive elastic body, wherein the electroconductive elastic body comprises:

a cross-linked product of a first ionic electro-conductive rubber, a cross-linked product of a second ionic electro-conductive rubber that is different from the first ionic electro-conductive rubber, and either one or both of a fatty acid and a fatty acid metal salt;

the electroconductive elastic body has a matrix that includes the cross-linked product of the first ionic electro-conductive rubber, and a domain that includes the cross-linked product of the second ionic electro-conductive rubber;

the cross-linked product of the second ionic electro-conductive rubber includes a polyether skeleton;

an electrical resistance of the domain is lower than an electrical resistance of the matrix;

in a waveform separation profile of the elastic body as obtained by waveform separation of a scattering profile measured at a temperature of 24° C. by a small-angle X-ray scattering method, a peak top of each of P1 and P2 exists in a range of 1.40 $nm^{-1}$ to 1.60 $nm^{-1}$, and a peak top of P3 exists in a range of 1.85 $nm^{-1}$ to 1.95 $nm^{-1}$, wherein P1 represents a peak attributable to the fatty acid, P2 represents a peak attributable to the fatty acid metal salt, and P3 represents a peak attributable to the cross-linked product of the second ionic electro-conductive rubber; and A2 and A1 satisfy a relationship expressed by the following expression (1):

$$0.005 \leq (A2 \times C2 / A1 \times C1) \leq 0.030 \tag{1}$$

wherein A1 represents a sum total of peak areas of P1 and P2, A2 represents a peak area of P3, C1 represents a content (% by mass) of the cross-linked product of the second ionic electro-conductive rubber in the elastic body, and C2 represents a content (% by mass) of the fatty acid and the fatty acid metal salt.

* * * * *